United States Patent
von Muhlen et al.

(10) Patent No.: US 10,963,430 B2
(45) Date of Patent: Mar. 30, 2021

(54) SHARED WORKSPACES WITH SELECTIVE CONTENT ITEM SYNCHRONIZATION

(71) Applicant: Dropbox, Inc., San Francisco, CA (US)

(72) Inventors: Marcio von Muhlen, San Francisco, CA (US); George Milton Underwood, IV, Palo Alto, CA (US); Anthony DeVincenzi, San Francisco, CA (US); Nils Bunger, Palo Alto, CA (US); Colin Dunn, San Francisco, CA (US); Adam Polselli, San Francisco, CA (US); Sam Jau, San Francisco, CA (US); Nathan Borror, Palo Alto, CA (US)

(73) Assignee: Dropbox, Inc., San Francisco, CA (US)

(*) Notice: Subject to any disclaimer, the term of this patent is extended or adjusted under 35 U.S.C. 154(b) by 51 days.

(21) Appl. No.: 15/984,968

(22) Filed: May 21, 2018

(65) Prior Publication Data

US 2018/0267989 A1 Sep. 20, 2018

Related U.S. Application Data

(63) Continuation of application No. 15/010,220, filed on Jan. 29, 2016, now Pat. No. 10,001,913.

(Continued)

(51) Int. Cl.
*G06F 16/176* (2019.01)
*G06F 3/0481* (2013.01)
(Continued)

(52) U.S. Cl.
CPC ........ *G06F 16/176* (2019.01); *G06F 3/04817* (2013.01); *G06F 16/14* (2019.01);
(Continued)

(58) Field of Classification Search
CPC ...... G06F 16/176; G06F 16/14; G06F 16/168; G06F 16/1787; G06F 16/178;
(Continued)

(56) References Cited

U.S. PATENT DOCUMENTS

| | | |
|---|---|---|
| 5,581,765 A | 12/1996 | Munroe et al. |
| 5,893,116 A | 4/1999 | Simmonds |

(Continued)

FOREIGN PATENT DOCUMENTS

| | | |
|---|---|---|
| EP | 1 517 260 A2 | 3/2005 |
| FR | 2924244 A1 | 5/2009 |

(Continued)

OTHER PUBLICATIONS

Lefebvre, Rob, Mastering iCloud on Your Mac: Use iClouDrive to Access Your Files Like Dropbox (OS X Tips) Posted on Mar. 28, 2013, at Cult of Mac, 3 pages.

(Continued)

*Primary Examiner* — Amy M Levy
(74) *Attorney, Agent, or Firm* — Hickman Becker Bingham Ledesma LLP

(57) ABSTRACT

Shared workspaces with selective content item synchronization. In one embodiment, for example, a personal computing device is configured to send a request to a server of a cloud-based content management system to join a shared workspace. The personal computing device then receives content item metadata about content items associated with the shared workspace. The content item metadata allows a user of the personal computing device to browse a content item-folder hierarchy for the content items even if only some but not all of the content items have been downloaded and stored at the personal computing device.

11 Claims, 7 Drawing Sheets

Related U.S. Application Data

(60) Provisional application No. 62/141,577, filed on Apr. 1, 2015.

(51) Int. Cl.

| | | |
|---|---|---|
| *G06F 16/14* | (2019.01) | |
| *G06F 16/16* | (2019.01) | |
| *G06F 16/178* | (2019.01) | |
| *H04L 29/08* | (2006.01) | |

(52) U.S. Cl.
CPC .......... *G06F 16/168* (2019.01); *G06F 16/178* (2019.01); *G06F 16/1787* (2019.01); *H04L 67/10* (2013.01); *H04L 67/1095* (2013.01); *H04L 67/36* (2013.01); *H04L 67/06* (2013.01)

(58) Field of Classification Search
CPC ............ G06F 3/04817; H04L 67/1095; H04L 67/36; H04L 67/10
See application file for complete search history.

(56) References Cited

U.S. PATENT DOCUMENTS

| | | | |
|---|---|---|---|
| 5,907,848 | A | 5/1999 | Zaiken |
| 5,926,821 | A | 7/1999 | Hirose |
| 6,061,743 | A | 5/2000 | Thatcher |
| 6,065,018 | A | 5/2000 | Beier |
| 6,108,703 | A | 8/2000 | Leighton et al. |
| 6,336,173 | B1 | 1/2002 | Day |
| 6,470,329 | B1 | 10/2002 | Livschitz |
| 6,473,426 | B1 | 10/2002 | Killian |
| 6,560,591 | B1 | 5/2003 | Memmott et al. |
| 6,728,723 | B1 | 4/2004 | Kathail et al. |
| 6,834,284 | B2 | 12/2004 | Acker et al. |
| 6,915,315 | B2 | 7/2005 | Autery |
| 7,035,847 | B2 | 4/2006 | Brown |
| 7,117,303 | B1 | 10/2006 | Zayas |
| 7,308,545 | B1 | 12/2007 | Kekre et al. |
| 7,318,134 | B1 | 1/2008 | Oliveira |
| 7,340,723 | B2 | 3/2008 | Antonov et al. |
| 7,401,089 | B2 | 7/2008 | Benton et al. |
| 7,437,405 | B1 | 10/2008 | Theis et al. |
| 7,512,638 | B2 | 3/2009 | Jhaveri et al. |
| 7,558,926 | B1 | 7/2009 | Oliveira |
| 7,599,941 | B2 | 10/2009 | Bahar et al. |
| 7,685,171 | B1 | 3/2010 | Beaverson et al. |
| 7,689,510 | B2 | 3/2010 | Lamkin |
| 7,716,180 | B2 | 5/2010 | Vermeulen et al. |
| 7,814,499 | B2 | 10/2010 | Straube |
| 7,865,571 | B2 | 1/2011 | Ho |
| 7,869,425 | B2 | 1/2011 | Elliott |
| 7,870,355 | B2 | 1/2011 | Erofeev |
| 7,890,646 | B2 | 2/2011 | Khosravy |
| 7,925,966 | B2 | 4/2011 | Kaler et al. |
| 7,937,686 | B2 | 5/2011 | Sorensen et al. |
| 7,953,785 | B2 | 5/2011 | Li et al. |
| 8,015,491 | B2 | 9/2011 | Shaver |
| 8,019,900 | B1 | 9/2011 | Sekar |
| 8,082,231 | B1 | 12/2011 | McDaniel et al. |
| 8,112,505 | B1 | 2/2012 | Ben-Shaul |
| 8,140,473 | B2 | 3/2012 | Sun |
| 8,185,601 | B2 | 5/2012 | Rauhala et al. |
| 8,214,747 | B1 | 7/2012 | Yankovich |
| 8,301,597 | B1 | 10/2012 | Zhou |
| 8,307,028 | B2 | 11/2012 | Kakivaya et al. |
| 8,312,046 | B1 | 11/2012 | Eisler et al. |
| 8,341,532 | B2 | 12/2012 | Ryan |
| 8,429,540 | B1 | 4/2013 | Yankovich |
| 8,458,299 | B2 | 6/2013 | Lin et al. |
| 8,484,260 | B2 | 7/2013 | Caso |
| 8,503,984 | B2 | 8/2013 | Winbush, III |
| 8,527,549 | B2 | 9/2013 | Cidon |
| 8,650,159 | B1 | 2/2014 | Zhang et al. |
| 8,656,218 | B2 | 2/2014 | Erofeev |
| 8,661,428 | B2 | 2/2014 | Clark |
| 8,713,106 | B2 | 4/2014 | Spataro |
| 8,775,374 | B2 | 7/2014 | Araki et al. |
| 8,805,793 | B2 | 8/2014 | Patiejunas et al. |
| 8,819,587 | B1 | 8/2014 | Shrum |
| 8,825,597 | B1 | 9/2014 | Houston |
| 8,874,799 | B1 | 10/2014 | Derbeko et al. |
| 8,880,538 | B1 | 11/2014 | Petersson et al. |
| 8,892,679 | B1 | 11/2014 | Destagnol |
| 8,930,412 | B2 | 1/2015 | Nelson |
| 8,949,179 | B2 | 2/2015 | Besen et al. |
| 8,949,208 | B1 | 2/2015 | Xu et al. |
| 8,959,067 | B1 | 2/2015 | Patiejunas et al. |
| 8,959,607 | B2 | 2/2015 | Yadav et al. |
| 9,037,556 | B2 | 5/2015 | Castellano et al. |
| 9,037,797 | B2 | 5/2015 | McGroddy-Goetz et al. |
| 9,043,567 | B1 | 5/2015 | Modukuri |
| 9,183,303 | B1 | 11/2015 | Goel |
| 9,185,164 | B1 | 11/2015 | Newhouse |
| 9,213,709 | B2 | 12/2015 | Patiejunas et al. |
| 9,253,166 | B2 | 2/2016 | Gauda |
| 9,282,169 | B1 * | 3/2016 | Chang ..................... G06F 16/27 |
| 9,286,102 | B1 | 3/2016 | Harel |
| 9,294,558 | B1 | 3/2016 | Vincent et al. |
| 9,361,349 | B1 | 6/2016 | Newhouse |
| 9,384,226 | B1 | 7/2016 | Goel et al. |
| 9,479,548 | B2 | 10/2016 | Swanson |
| 9,479,567 | B1 | 10/2016 | Koorapati et al. |
| 9,479,578 | B1 | 10/2016 | Swanson et al. |
| 9,563,681 | B1 | 2/2017 | Patiejunas et al. |
| 9,652,741 | B2 | 5/2017 | Goldberg et al. |
| 9,697,269 | B2 | 7/2017 | Koorapati |
| 9,727,470 | B1 | 8/2017 | Cande et al. |
| 9,773,051 | B2 | 9/2017 | Smith |
| 9,817,878 | B2 | 11/2017 | Newhouse |
| 9,819,740 | B2 | 11/2017 | Tataroiu |
| 9,852,147 | B2 | 12/2017 | Von Muhlen |
| 9,852,150 | B2 | 12/2017 | Sharpe et al. |
| 9,961,149 | B2 | 5/2018 | Poletto et al. |
| 10,116,732 | B1 | 10/2018 | Canton et al. |
| 10,198,452 | B2 | 2/2019 | Habouzit et al. |
| 10,324,903 | B1 | 6/2019 | Goldberg et al. |
| 2002/0048174 | A1 | 4/2002 | Pederson et al. |
| 2002/0078174 | A1 | 6/2002 | Sim |
| 2002/0112058 | A1 | 8/2002 | Weisman |
| 2002/0120763 | A1 | 8/2002 | Miloushev |
| 2002/0174180 | A1 | 11/2002 | Brown |
| 2003/0018878 | A1 | 1/2003 | Dorward |
| 2004/0024786 | A1 | 2/2004 | Anderson |
| 2004/0034712 | A1 | 2/2004 | Rajwan et al. |
| 2004/0064488 | A1 | 4/2004 | Sinha |
| 2004/0068523 | A1 | 4/2004 | Keith |
| 2004/0133573 | A1 | 7/2004 | Miloushev |
| 2004/0133606 | A1 | 7/2004 | Miloushev |
| 2004/0133607 | A1 | 7/2004 | Miloushev |
| 2004/0133652 | A1 | 7/2004 | Miloushev |
| 2004/0162900 | A1 | 8/2004 | Bucher |
| 2005/0071336 | A1 | 3/2005 | Najork |
| 2005/0091672 | A1 | 4/2005 | Debique et al. |
| 2005/0262371 | A1 | 11/2005 | Luke |
| 2005/0289237 | A1 | 12/2005 | Matsubara |
| 2006/0041844 | A1 | 2/2006 | Homiller |
| 2006/0064467 | A1 | 3/2006 | Libby |
| 2006/0179083 | A1 | 8/2006 | Kulkarni |
| 2006/0206547 | A1 | 9/2006 | Kulkarni |
| 2006/0277196 | A1 | 12/2006 | Oosawa et al. |
| 2007/0024919 | A1 | 2/2007 | Wong |
| 2007/0028215 | A1 | 2/2007 | Kamath |
| 2007/0043747 | A1 | 2/2007 | Benton |
| 2007/0055703 | A1 | 3/2007 | Zimran |
| 2007/0079083 | A1 | 4/2007 | Gladwin et al. |
| 2007/0088702 | A1 | 4/2007 | Fridella |
| 2007/0100829 | A1 | 5/2007 | Allen |
| 2007/0100913 | A1 | 5/2007 | Sumner et al. |
| 2007/0136308 | A1 | 6/2007 | Tsirigotis et al. |
| 2007/0198710 | A1 | 8/2007 | Gopalakrishnan |
| 2007/0214497 | A1 | 9/2007 | Montgomery et al. |
| 2007/0220220 | A1 | 9/2007 | Ziv |
| 2007/0250552 | A1 | 10/2007 | Lango |

(56) References Cited

U.S. PATENT DOCUMENTS

| | | |
|---|---|---|
| 2007/0294366 A1 | 12/2007 | Ozzie et al. |
| 2008/0005195 A1 | 1/2008 | Li |
| 2008/0046218 A1 | 2/2008 | Dontcheva |
| 2008/0141250 A1 | 6/2008 | Dorn |
| 2008/0208870 A1* | 8/2008 | Tsang ............... G06F 16/172 |
| 2008/0212616 A1 | 9/2008 | Augustine et al. |
| 2008/0267221 A1 | 10/2008 | Ozzie et al. |
| 2009/0030986 A1 | 1/2009 | Bates |
| 2009/0037514 A1 | 2/2009 | Lankford et al. |
| 2009/0055464 A1 | 2/2009 | Multer |
| 2009/0083394 A1 | 3/2009 | Diot |
| 2009/0094252 A1 | 4/2009 | Wong |
| 2009/0125522 A1 | 5/2009 | Kodama et al. |
| 2009/0138529 A1 | 5/2009 | Bellessort |
| 2009/0144784 A1 | 6/2009 | Li |
| 2009/0192845 A1 | 7/2009 | Gudipaty |
| 2009/0216745 A1 | 8/2009 | Allard |
| 2009/0222741 A1 | 9/2009 | Shaw |
| 2009/0271412 A1 | 10/2009 | Lacapra |
| 2009/0271502 A1 | 10/2009 | Xue |
| 2009/0271779 A1 | 10/2009 | Clark |
| 2009/0300071 A1 | 12/2009 | Arcese |
| 2009/0313353 A1 | 12/2009 | Lou |
| 2009/0327405 A1 | 12/2009 | FitzGerald |
| 2010/0011088 A1 | 1/2010 | Gautier |
| 2010/0146569 A1 | 6/2010 | Janardhan |
| 2010/0198944 A1 | 8/2010 | Ho et al. |
| 2010/0241711 A1 | 9/2010 | Ansari |
| 2010/0293147 A1 | 11/2010 | Snow et al. |
| 2010/0332401 A1 | 12/2010 | Prahlad et al. |
| 2011/0153759 A1 | 6/2011 | Rathod |
| 2011/0154431 A1 | 6/2011 | Walsh |
| 2011/0225293 A1 | 9/2011 | Rathod et al. |
| 2011/0258488 A1 | 10/2011 | Nightingale et al. |
| 2012/0084379 A1 | 4/2012 | Peng et al. |
| 2012/0151201 A1 | 6/2012 | Clerc |
| 2012/0197844 A1 | 8/2012 | Wang et al. |
| 2012/0203817 A1 | 8/2012 | Hu et al. |
| 2012/0221520 A1 | 8/2012 | Garrett |
| 2012/0221811 A1 | 8/2012 | Sparkes |
| 2012/0226649 A1 | 9/2012 | Kovacs |
| 2013/0013560 A1 | 1/2013 | Goldberg |
| 2013/0014023 A1 | 1/2013 | Lee et al. |
| 2013/0041872 A1 | 2/2013 | Aizman |
| 2013/0073689 A1 | 3/2013 | Kolam et al. |
| 2013/0080919 A1 | 3/2013 | Kiang |
| 2013/0094445 A1 | 4/2013 | De et al. |
| 2013/0135608 A1 | 5/2013 | Payne et al. |
| 2013/0138608 A1 | 5/2013 | Smith |
| 2013/0160072 A1 | 6/2013 | Reus |
| 2013/0191339 A1 | 7/2013 | Haden |
| 2013/0198600 A1 | 8/2013 | Lockhart |
| 2013/0212112 A1 | 8/2013 | Blom |
| 2013/0212484 A1 | 8/2013 | Joshi |
| 2013/0212485 A1 | 8/2013 | Yankovich |
| 2013/0218837 A1 | 8/2013 | Bhatnagar et al. |
| 2013/0227083 A1 | 8/2013 | Kim et al. |
| 2013/0268480 A1 | 10/2013 | Dorman |
| 2013/0275398 A1 | 10/2013 | Dorman |
| 2013/0275509 A1 | 10/2013 | Micucci et al. |
| 2013/0297887 A1* | 11/2013 | Woodward ............ G06F 16/172 711/137 |
| 2013/0318229 A1 | 11/2013 | Bakre et al. |
| 2013/0332418 A1 | 12/2013 | Kim |
| 2013/0339407 A1 | 12/2013 | Sharpe et al. |
| 2013/0346374 A1 | 12/2013 | Wolf |
| 2013/0346557 A1 | 12/2013 | Chang |
| 2014/0025948 A1 | 1/2014 | Bestler |
| 2014/0046906 A1 | 2/2014 | Patiejunas et al. |
| 2014/0047070 A1 | 2/2014 | Lee et al. |
| 2014/0053227 A1 | 2/2014 | Ruppin |
| 2014/0059642 A1 | 2/2014 | Deasy |
| 2014/0074663 A1 | 3/2014 | Alsina |
| 2014/0074783 A1 | 3/2014 | Alsina |
| 2014/0101310 A1* | 4/2014 | Savage ............... H04L 43/00 709/224 |
| 2014/0115115 A1 | 4/2014 | Kuang |
| 2014/0122428 A1 | 5/2014 | Zhou |
| 2014/0126800 A1 | 5/2014 | Lang et al. |
| 2014/0143446 A1 | 5/2014 | Jacobson |
| 2014/0156793 A1* | 6/2014 | Chan ............... H04L 67/06 709/217 |
| 2014/0172783 A1 | 6/2014 | Suzuki |
| 2014/0173027 A1 | 6/2014 | Kappes |
| 2014/0173137 A1 | 6/2014 | Jacobson |
| 2014/0181697 A1 | 6/2014 | Kirigin |
| 2014/0188803 A1 | 7/2014 | James et al. |
| 2014/0195652 A1 | 7/2014 | Yerkes |
| 2014/0208220 A1 | 7/2014 | Watal |
| 2014/0215436 A1 | 7/2014 | DeLuca |
| 2014/0215551 A1 | 7/2014 | Allain |
| 2014/0215568 A1 | 7/2014 | Kirigin |
| 2014/0229839 A1 | 8/2014 | Lynch |
| 2014/0250073 A1 | 9/2014 | Zalpuri et al. |
| 2014/0280602 A1 | 9/2014 | Quatrano |
| 2014/0304384 A1 | 10/2014 | Varenhorst et al. |
| 2014/0304618 A1 | 10/2014 | Carriero |
| 2014/0324777 A1 | 10/2014 | Novak |
| 2014/0324945 A1 | 10/2014 | Novak |
| 2014/0330874 A1 | 11/2014 | Novak et al. |
| 2014/0358860 A1 | 12/2014 | Wautier |
| 2014/0359465 A1 | 12/2014 | Litan |
| 2014/0365432 A1 | 12/2014 | Jain |
| 2014/0379586 A1* | 12/2014 | Sawyer ............... H04L 67/00 705/301 |
| 2015/0006146 A1 | 1/2015 | Wilkes et al. |
| 2015/0006475 A1 | 1/2015 | Guo |
| 2015/0019432 A1 | 1/2015 | Burns |
| 2015/0046557 A1 | 2/2015 | Rosenberg |
| 2015/0052392 A1 | 2/2015 | Mickens |
| 2015/0058932 A1* | 2/2015 | Faitelson ............ G06F 21/6218 726/3 |
| 2015/0082198 A1 | 3/2015 | Destagnol |
| 2015/0113222 A1 | 4/2015 | Naik |
| 2015/0134808 A1 | 5/2015 | Fushman |
| 2015/0142742 A1 | 5/2015 | Hong |
| 2015/0161016 A1 | 6/2015 | Bulkowski |
| 2015/0180948 A1 | 6/2015 | Shao |
| 2015/0186395 A1 | 7/2015 | Yan |
| 2015/0207844 A1 | 7/2015 | Tataroiu et al. |
| 2015/0227757 A1 | 8/2015 | Bestler |
| 2015/0249647 A1 | 9/2015 | Mityagin et al. |
| 2015/0254320 A1 | 9/2015 | Cowling |
| 2015/0278884 A1 | 10/2015 | Manzari et al. |
| 2015/0288754 A1 | 10/2015 | Mosko et al. |
| 2015/0288755 A1 | 10/2015 | Mosko et al. |
| 2015/0347552 A1 | 12/2015 | Habouzit et al. |
| 2015/0347553 A1 | 12/2015 | Aizman |
| 2015/0358373 A1 | 12/2015 | Famaey et al. |
| 2016/0006646 A1 | 1/2016 | Lin |
| 2016/0021172 A1 | 1/2016 | Mahadevan et al. |
| 2016/0044126 A1 | 2/2016 | Mahadevan et al. |
| 2016/0050177 A1 | 2/2016 | Cue |
| 2016/0055248 A1 | 2/2016 | Goel et al. |
| 2016/0057217 A1 | 2/2016 | Beaverson |
| 2016/0062963 A1 | 3/2016 | Umapathy |
| 2016/0078068 A1 | 3/2016 | Agrawal |
| 2016/0087931 A1 | 3/2016 | Kim |
| 2016/0092443 A1 | 3/2016 | Hayes |
| 2016/0164761 A1 | 6/2016 | Sathyanarayana |
| 2016/0196274 A1* | 7/2016 | Gadde ............... G06F 16/1734 707/626 |
| 2016/0217387 A1 | 7/2016 | Okanohara |
| 2016/0226970 A1 | 8/2016 | Newhouse |
| 2016/0267103 A1 | 9/2016 | Silk |
| 2016/0292179 A1 | 10/2016 | Muhlen |
| 2016/0292443 A1 | 10/2016 | Muhlen |
| 2016/0313934 A1 | 10/2016 | Isherwood |
| 2016/0321338 A1 | 11/2016 | Isherwood |
| 2017/0109370 A1 | 4/2017 | Newhouse |
| 2017/0124111 A1 | 5/2017 | Sharma |
| 2017/0124170 A1 | 5/2017 | Koorapati |
| 2017/0126782 A1 | 5/2017 | Koorapati |

(56) References Cited

U.S. PATENT DOCUMENTS

| | | | |
|---|---|---|---|
| 2017/0126800 | A1 | 5/2017 | Koorapati et al. |
| 2017/0126802 | A1 | 5/2017 | Koorapati |
| 2017/0177332 | A1 | 6/2017 | DeLuca |
| 2017/0195417 | A1 | 7/2017 | Brand |
| 2017/0208125 | A1* | 7/2017 | Jai ...................... H04L 67/1097 |
| 2017/0222865 | A1 | 8/2017 | Koorapati et al. |
| 2017/0255687 | A1 | 9/2017 | Koorapati et al. |
| 2018/0048687 | A1 | 2/2018 | Bryant et al. |
| 2018/0060410 | A1 | 3/2018 | Stading et al. |

FOREIGN PATENT DOCUMENTS

| | | |
|---|---|---|
| JP | H0816444 A | 1/1996 |
| JP | 2003030026 A | 1/2003 |
| JP | 2005011354 A | 1/2005 |
| JP | 2005141475 A | 6/2005 |
| JP | 2008538843 A | 11/2008 |
| JP | 2008305221 A | 12/2008 |
| JP | 2010074604 A | 4/2010 |
| JP | 2012079042 A | 4/2012 |
| JP | 2012079043 A | 4/2012 |
| JP | 2012093911 A | 5/2012 |
| JP | 2012513632 A | 6/2012 |
| JP | 2012182292 A | 9/2012 |
| JP | 2013182292 A | 9/2013 |
| JP | 2014038569 A | 2/2014 |
| JP | 2015505627 A | 2/2015 |
| JP | 20155058627 A | 2/2015 |
| JP | 2016505964 A | 2/2016 |
| WO | 2005060387 A3 | 4/2009 |
| WO | WO2009/124014 A2 | 10/2009 |
| WO | WO-2010073110 A1 | 7/2010 |
| WO | WO2014/099044 A1 | 6/2014 |
| WO | WO-2015031755 A1 | 3/2015 |
| WO | WO2015/153045 A1 | 10/2015 |

OTHER PUBLICATIONS

Hendrickson, Mark, Dropbox the Online Storage Solution We've Been Waiting for?, Posted on Mar. 2008, at TechChurch, 6 pages.
European Patent Office, "Search Report" in application No. PCT/US2016/025015, dated Jun. 16, 2016, 11 pages.
European Patent Office, "Search Report" in application No. PCT/US2016/025014, dated Jul. 14, 2016, 11 pages.
European Claims in application No. PCT/US2016/025014, dated Jul. 2016, 7 pages.
European Claims in application No. PCT/US 2016/025015, dated Jun. 2016, 6 pages. Dropbox Screenshot, Publically Avaiable dated Jul. 3, 2013, From http:/www.filewin.net/Dropbox/, via Internet Archive on Oct. 17, 2016, 2 pages.
Brim, Michael, "Extreme Scale via Group File Semantics", ProQuest Dissertations Publishing, dated 2012, Dissertation/thesis No. 3508182, 202 pages.
U.S. Appl. No. 14/979,226, filed Dec. 22, 2015, Final Office Action, dated Nov. 16, 2016.
Koorapati, U.S. Appl. No. 14/979,252, filed Dec. 22, 2015, Final Office Action, dated Jul. 1, 2019.
Koorapati, U.S. Appl. No. 14/979,252, filed Dec. 22, 2015, Office Action, dated Oct. 26, 2017.
Koorapati, U.S. Appl. No. 14/979,252, filed Dec. 22, 2015, Office Action, dated Dec. 14, 2018.
Koorapati, U.S. Appl. No. 14/979,252, filed Dec. 22, 2015, Interview Summary, dated Mar. 15, 2019.
Koorapati, U.S. Appl. No. 14/979,268, filed Dec. 22, 2015, Notice of Allowance, dated Mar. 23, 2017.
Koorapati, U.S. Appl. No. 15/332,782, filed Oct. 24, 2016, Final Office Action, dated Feb. 7, 2019.
Koorapati, U.S. Appl. No. 15/332,782, filed Oct. 24, 2016, Office Action, dated Oct. 5, 2018.
Koorapati, U.S. Appl. No. 15/355,286, filed Nov. 18, 2016, Office Action, dated Mar. 19, 2019.
Koorapati, U.S. Appl. No. 15/355,305, filed Nov. 18, 2016, Notice of Allowance, dated Sep. 22, 2017.
Koorapati, U.S. Appl. No. 15/355,305, filed Nov. 18, 2016, Office Action, dated May 22, 2017.
Koorapati, U.S. Appl. No. 15/603,193, filed May 23, 2017, Final Office Action, dated Jan. 29, 2018.
Koorapati, U.S. Appl. No. 14/979,252, filed Dec. 22, 2015, Final Office Action, dated May 3, 2018.
Korrapati, U.S. Appl. No. 15/603,193, filed May 23, 2017, Notice of Allowance, dated Jul. 10, 2018.
Von Muhlen, U.S. Appl. No. 14/979,226, filed Dec. 22, 2015, Office Action, dated Mar. 23, 2017.
U.S. Appl. No. 14/979,226, filed Dec. 22, 2015, Office Action, dated Jun. 16, 2016.
U.S. Appl. No. 14/979,234, filed Dec. 22, 2015, Notice of Allowance, dated Jun. 13, 2016.
U.S. Appl. No. 14/979,252, filed Dec. 22, 2015, Final Office Action, dated Nov. 21, 2016.
U.S. Appl. No. 14/979,252, filed Dec. 22, 2015, Office Action, dated May 23, 2016.
U.S. Appl. No. 14/979,256, filed Dec. 22, 2015, Office Action, dated May 4, 2016.
U.S. Appl. No. 14/979,256, filed Dec. 22, 2015, Notice of Allowance, dated Aug. 5, 2016.
U.S. Appl. No. 14/979,268, filed Dec. 22, 2015, Final Office Action, dated Nov. 18, 2016.
U.S. Appl. No. 14/979,268, filed Dec. 22, 2015, Office Action, dated May 18, 2016.
U.S. Appl. No. 15/010,235, filed Jan. 29, 2016, Notice of Allowance, dated Aug. 30, 2016.
U.S. Appl. No. 15/010,235, filed Jan. 29, 2016, Office Action, dated May 12, 2016.
U.S. Appl. No. 15/63,193, filed May 23, 2017, Notice of Allowance, dated Jul. 10, 2018.
Koorapati, U.S. Appl. No. 15/603,193, filed May 23, 2017, Office Action, dated Sep. 11, 2017.
Nikkei Business Publicaitons Inc., "One Device for on the Go or at Home!, Evolution of the Notebook PC, Windows Complete Strategy, PC Cooperation Volume Simple File Sharing Via Cloud", Aug. 24, 2014, 11pgs.
Japanese Patent Office, "Search Report" in application No. 2017-550817, dated Dec. 25, 2018, 8 pages.
Japanese Patent Office, "Search Report" in application No. 2017-550811, dated Dec. 20, 2018, 6 pages.
Japanese Claims in application No. 2017-550817, dated Dec. 2018, 4 pages.
Australian Patent Office, "Search Report" in application No. 2016243644, dated Dec. 18, 2018, 4 pages.
Australian Patent Office, "Notice of Acceptance", in application No. 2016242857, dated Dec. 18, 2018, 3 pages.
Australian Claims in application No. 2016242857, dated Dec. 2018, 4 pages.
Australia Claims in application No. 2016243644, dated Dec. 2018, 4 pages.
White, Tom, "Chapter 3: The Hadoop Distributed Filesystem", In: Hadoop—The Definitive Guide, dated Apr. 17, 2015, pp. 43-78.
Li, Brandon, "Simplifying Data Management: NFS Access to HDFS—Hortonworks", dated May 13, 2013, 13 pages.
European Patent Office, "Search Report" in application No. 16 791 146.0-1222, dated Dec. 7, 2018, 15 pages.
European Patent Office, "Communicaiton Pursuant to Article 94", in application No. 16 791 147.8-1222, dated Feb. 18, 2019, 5 pages.
European Claims in application No. 16 791 147.8-1222, dated Feb. 2019, 5 pages.
European Claims in application No. 16 791 146.0-1222, dated Dec. 2018, 4 pages.
Australian Patent Office, "Search Report" in application No. 2016346892, dated Jan. 21, 2019, 3 pages.
Australian Claims in application No. 2016346892, dated Jan. 2019, 9 pages.
European Claims in application No. PCT/US2017/014945, dated Mar. 2017, 4 pages.

(56) References Cited

OTHER PUBLICATIONS

Adele Lu Jia et al., "Designs and Evaluation of a Tracker in P2P Networks", Peer-to-Peer Computing, dated 2008, 4 pages.
Barr, Jeff, AWS Official Blog, "Amazon S3: Multipart Upload", dated Nov. 10, 2010, 3 pages.
Bonadea et al., "Cloud Storage", Wikipedia, daetd Oct. 28, 2015,https://en.wikipedia.org/w/index.php?title=Cloud_storage&oldid=687899972, 5 pages.
Camacho et al., "A Cloud Enviroment for Backup and Data Storage", 2014 International Conference on (CONIELECOMP), IEEE, dated 2014, 7 pages.
Current Claims in application No. PCT/US2016/0056349, dated Jan. 2017, 3 pages.
Current Claims in application No. PCT/US2016/056348, dated Jan. 2017, 4 pages.
Dee, Matt, "Inside LAN Sync", DropBox Tech Blog, dated Oct. 13, 2015, 9 pages.
European Claims in application No. PCT/US 2016/056344, dated Feb. 2017, 4 pages.
"A Destination and a House are Easy File Sharing at Cloud Course of a Colet One-set!", Notebook PC Evolved type Windows Tablet Full Capture PC Cooperation, vol. 19 Aug. 24, 2014, pp. 300-352.
European Claims in application No. PCT/US2016/056346, dated Jan. 2017, 9 pages.
Zhu et al., "Let's ChronoSync: Decentralized Dataset State Synchronization in Named Data Networking", IEEE, dated 2013, 10 pages.
European Patent Office, "Search Report" in application No. PCT/US 2016/056344, dated Feb. 28, 2017, 22 pages.
European Patent Office, "Search Report" in application No. PCT/US2016/056345, dated Feb. 28, 2017, 20 pages.
European Patent Office, "Search Report" in application No. PCT/US2016/056346, dated Jan. 5, 2017, 11 pages.
European Patent Office, "Search Report" in application No. PCT/US2017/014945, dated Mar. 14, 2017, 11 pages.
Idilio Drago et al., "Inside Dropbox", Proceedings of the 2012 ACM Conference on Internet Measurement Conference, IMC, dated 2012, vol. 16, dated Nov. 14, 2012, 14 pages.
Koorapati, Nipunn, "Streaming File Synchronization", Dropbox Tech Blog, dated Jul. 11, 2014, 14 pages.
Syncovery: "Blocking Level Copying", Synovery, from the internet www.synovery.com/block-level-copying/>, dated May 22, 2014, 2 pages.
The International Searching Authority, "Search Report" in application No. PCT/US2016/0056349, dated Jan. 18, 2017, 13 pages.
The International Searching Authority, "Search Report" in application No. PCT/US2016/056348, dated Jan. 19, 2007, 14 pages.
Tridgell et al., "TR-CS-96-05 the Rsync Algorithm", dated Jun. 1996, 8 pages.
European Claims in application No. PCT/US2016/056345, dated Feb. 2017, 6 pages.
Notice of Allowance from U.S. Appl. No. 14/979,252, dated Dec. 11, 2019, 11 pages.
Communication Pursuant to Article 94(3) for EP Application No. 16715433.5 dated Oct. 9, 2019, 6 pages.
Notice of Allowance from U.S. Appl. No. 15/870,365, dated Nov. 8, 2019, 11 pages.
Claims for Japanese Application No. 2017-550811 dated Dec. 2018, 4 pages.
Claims for Japanese Application No. 2018-504709 dated May 2019, 9 pages.
Final Office Action for U.S. Appl. No. 15/010,220 dated Feb. 22, 2017, 22 pages.
First Office Action for Japanese Application No. 2018-504709 dated May 31, 2019, 12 pages.
Interview Summary for U.S Appl. No. 14/961,067 dated Oct. 11, 2017, 2 pages.
Interview summary for U.S. Appl. No. 14/979,252 dated Aug. 27, 2019, 3 Pages.
Notice of Allowance for U.S Appl. No. 14/961,067 dated Nov. 6, 2017, 10 pages.
Notice of Allowance for U.S. Appl. No. 15/010,220 dated Feb. 22, 2018, 9 pages.
Office Action for U.S. Appl. No. 14/961,067 dated Jul. 7, 2017, 13 pages.
Office Action for U.S. Appl. No. 15/010,220 dated Oct. 25, 2016, 15 pages.
Office Action for U.S. Appl. No. 15/010,220 dated Sep. 28, 2017, 24 pages.
Office Action for U.S. Appl. No. 15/870,365 dated Jul. 25, 2019, 14 pages.
Communication Pursuant to Article 94(3) EPC for European Application No. 16791147.8 dated Nov. 28, 2019, 4 pages.
Koorapati, U.S. Appl. No. 15/355,286, filed Nov. 18, 2016, Final Office Action, dated Aug. 29, 2019.
Koorapati, U.S. Appl. No. 15/332,782, filed Oct. 24, 2016, Interview Summary, dated Oct. 23, 2019.
Koorapati, U.S. Appl. No. 14/979,252, filed Dec. 22, 2015, Interview Summary, dated Aug. 27, 2019.
Non-Final Office Action from U.S. Appl. No. 15/870,365, dated Apr. 15, 2020, 15 pages.
Notice of Allowance from U.S. Appl. No. 14/979,252, dated Apr. 24, 2020, 3 pages.
Communication Pursuant to Article 94(3) EPC for European Application No. 17703601.9 dated Mar. 4, 2020, 8 pages.
Summons to Attend Oral Proceedings Pursuant to Rule 115(1) EPC for EP Application No. 16791146.0 dated Jan. 13, 2020, 13 pages.
Final Office Action from U.S. Appl. No. 15/332,782, dated Jan. 22, 2020, 20 pages.
Non-Final Office Action from U.S. Appl. No. 15/891,296, dated Jan. 16, 2020, 12 pages.
Notice of Allowance from U.S. Appl. No. 15/355,286, dated Jan. 15, 2020, 5 pages.
Notice of Allowance from U.S. Appl. No. 15/870,365, dated Jan. 23, 2020, 2 pages.
Extended European Search Report for EP Application No. 20152072.3 dated Jun. 16, 2020, 11 pages.
Griffith-Jones G., "Log file," Wikipedia, XP055701533, Aug. 21, 2015, Retrieved from https://en.wikipedia.org/w/index.php?title=Log_file&oldid=677169702 on Jun. 5, 2020, 3 pages.
Communication under rule 71(3) EPC for European Application No. 16715433.5 dated Jul. 20, 2020, 42 pages.
Notice of Allowance from U.S. Appl. No. 15/332,782, dated Apr. 29, 2020, 13 pages.
Notice of Allowance from U.S. Appl. No. 15/891,296, dated Apr. 29, 2020, 8 pages.
Communication under rule 71(3) EPC Intention to Grant for European Application No. 16791147.8 dated Apr. 30, 2020, 7 pages.
Communication under Rule 71(3) EPC of Intention to Grant for European Application No. 16790778.1 dated May 4, 2020, 7 pages.
Communication under Rule 71(3) EPC of Intention to Grant for European Application No. 16791148.6 dated May 11, 2020, 7 pages.
Result of consultation for European Application No. 16715433.5 mailed on May 28, 2020, 3 pages.
Notice of Allowance from U.S. Appl. No. 15/355,286, dated Jul. 8, 2020, 2 pages.
Ganzha M., et al., "Identifier Management in Semantic Interoperability Solutions for IoT," IEEE International Conference on Communications Workshops, Jul. 12, 2018, downloaded from the Internet: https://www.researchgate.net/publication/326218197_Identifier_Management_in_Semantic_Interoperabilit . . . , 7 pages.
Non-Final Office Action from U.S. Appl. No. 16/702,648, dated Jul. 9, 2020, 10 pages.
Notice of Allowance from U.S. Appl. No. 15/870,365, dated Aug. 17, 2020, 12 pages.
Notice of Allowance from U.S. Appl. No. 14/979,252, dated Apr. 2, 2020, 6 pages.
Notice of Allowance from U.S. Appl. No. 15/332,782, dated Apr. 6, 2020, 11 pages.
Notice of Allowance from U.S. Appl. No. 14/979,252, dated May 19, 2020, 2 pages.

(56) References Cited

OTHER PUBLICATIONS

Result of Consultation for European Application No. 16791146.0 dated Nov. 6, 2020, 10 pages.
Extended European Search Report for European Application No. 20197908.5 dated Oct. 30, 2020, 11 pages.
Freeplant et al., "Comments from Freeplant," Support for Multiple ServersiMirrors, X055736599, URL:https://github.com/haiwen/seafile/issues1110#issuecomment-13728419, Feb. 18, 2013, 13 pages.
Decision to refuse European Patent Application No. 16791146.0 dated Feb. 4, 2021, 31 pages.

* cited by examiner

SHARED WORKSPACES WITH SELECTIVE CONTENT ITEM SYNCHRONIZATION

PRIORITY CLAIM

This application claims the benefit as a continuation of U.S. patent application Ser. No. 15/010,220, filed Jan. 29, 2016; which claims the benefit of provisional application 62/141,577, filed Apr. 1, 2015, the entire contents of each of which is hereby incorporated by reference as if fully set forth herein.

TECHNICAL FIELD

The present application relates generally to cloud-based content management systems and, more specifically, to synchronized content management systems for storing, managing, sharing, and accessing digital content items such as, for example, digital documents and files.

BACKGROUND

Traditionally, businesses and other organizations have stored their digital content items (e.g., documents, files, and other digital information) on network file servers they owned and operated. Such file servers were typically located on-site behind a network firewall that prevented unauthorized network access to the content items stored on the file server. This arrangement worked well when most or all of the network access to the file server was by computers which were also behind the network firewall such as, for example, connected to the same Local Area Network (LAN) as the file server. In some cases, network access to the file server from outside the firewall (e.g., over the Internet) was facilitated by a Virtual Private Network (VPN). The VPN, in effect, made a computer outside the firewall appear to the file server as if it was behind the firewall.

Today, however, the workforce is more global and more mobile. This is spurred, in large part, by the wide-spread availability of broadband Internet connectivity and also the availability of relatively inexpensive, yet powerful, personal computing devices such as, for example, desktop computers, mobile phones, laptop computers, and tablet computers. The result is employees can work virtually anywhere and do not necessarily need to be physically present in the office to get their work done (e.g., they can work remotely).

To work remotely, employees often store content items locally at their personal computers (e.g., on a local hard disk) that are copied from their employer's file server so that they can work with the content items offline or otherwise while not connected by a network to the file server. This is less than ideal from the employer's perspective because the employer has less control over the locally stored content items when compared to the content items stored on the file server. This lack of control, which stems from storing local copies of the content items at the employee's personal computing device, poses risk to both the employer and the employee, for example, if the employee's personal computing device is lost, damaged, or stolen.

Recently, cloud-based content management services have become available for storing content items "in the cloud" where they are accessible on the Internet. A business may use a cloud-based content management service to "host" their content items on servers operated by the service in addition to or instead of storing content items on their own file servers. Cloud-based storage of content items can provide a number of benefits to businesses and their employees alike. Dropbox, for instance, offers the ability to synchronize and share hosted content items among multiple devices and users. This flexibility, which stems from storing content items both at end-user devices and on Dropbox servers, supports a variety of different on-site and remote working arrangements, providing convenience to employees and increased employee productivity for employers.

Notwithstanding the benefits of cloud-based content management services, current services do not provide businesses with the control they desire and in a way that does not unnecessarily hinder the productivity of the employees. Consider the following problem. Employees of a business may collectively host hundreds of gigabytes of content items or more with a cloud-based content management service. However, the employees may have personal computing devices that can store locally only tens of gigabytes of data making it infeasible to store all of the hosted content items at any one personal computing device. Thus, employees may adopt various ad-hoc solutions to get local access at their personal computing devices to the subset of content items they need. For example, a team of employees may create an account with a cloud-based content management service containing the subset of content items. The team members may then use shared credentials to access the content items using the service. The use of shared credentials by multiple employees makes it more difficult for the business to track individual employee access to the content items and also makes it more difficult for the business to control which employees have access to the content items. This has become a massive data management problem that is posing critical administrative challenges for businesses and cloud-based content management service providers.

Given the increasing amount of digital information generated by businesses, hosting of content items by businesses with cloud-based content management services can only be expected to increase. This trend is coupled with a desire of the businesses to retain a level of control over the content items they host with such services. The present invention fulfills this and other needs.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

The above-deficiencies and other problems associated with existing cloud-based content management services are reduced or eliminated by the disclosed cloud-based synchronized content management system providing shared workspaces and selective content item synchronization. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Example Cloud Computing Environment

Figure 1:
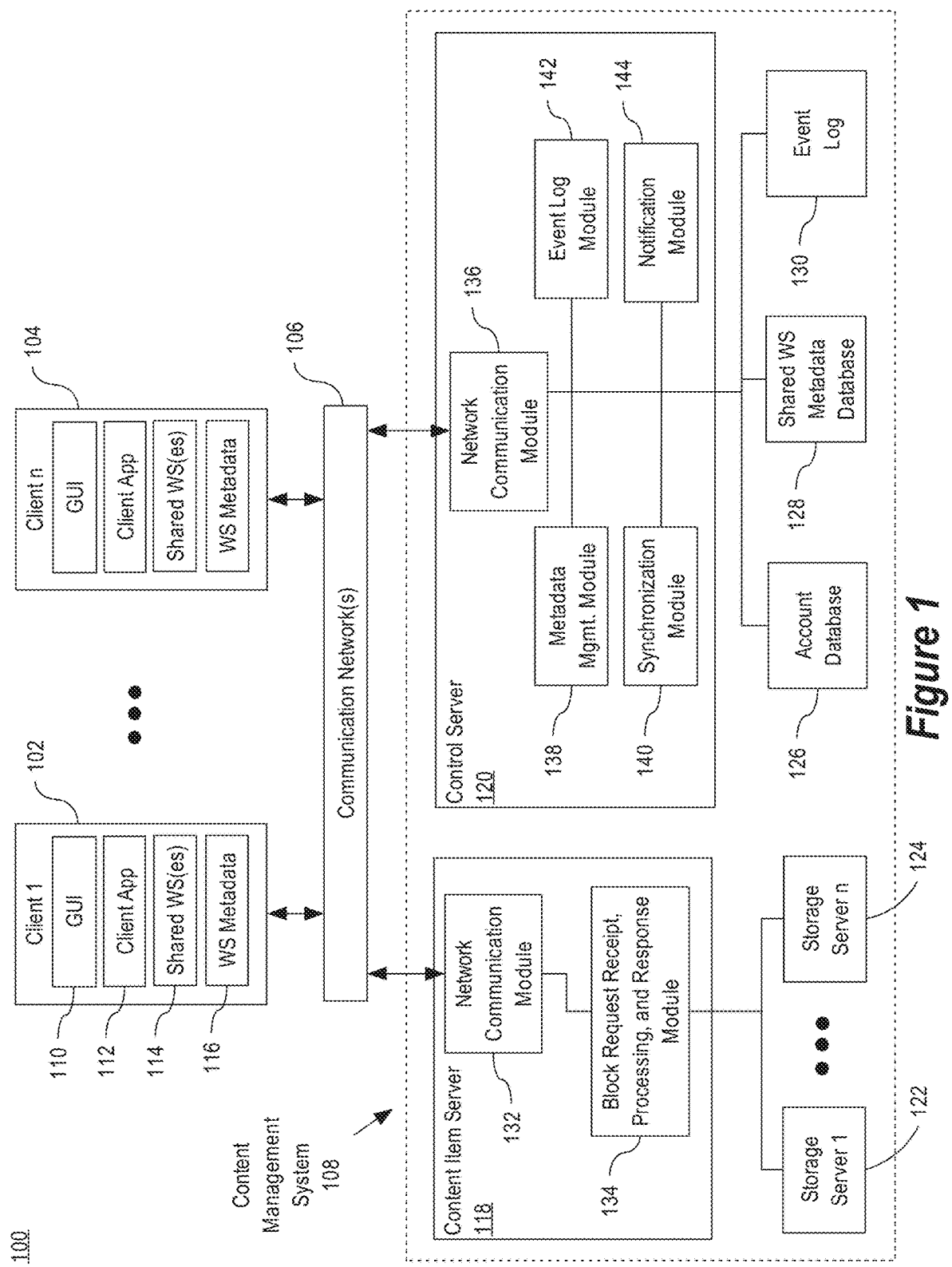
FIG. 1 is a block diagram illustrating an exemplary distributed computing environment according to an embodiment of the present invention.

FIG. 1 is a block diagram illustrating an exemplary distributed computer system 100 according to an embodiment of the invention. FIG. 1 shows various functional components that will be referred to in the detailed discussion that follows. The system 100 may include one or more clients 102-104. Client 102 can be any of a number of devices (e.g., computer, internet kiosk, personal digital assistant, cell phone, gaming device, desktop computer, laptop computer, or tablet computer) used to enable the activities described below. Client 102 includes graphical user interface (GUI) 110, client application 112, one or more shared workspaces 114, and shared workspace metadata 116 pertaining to the shared workspaces 114. Clients 102-104 are connected to a communications network 106. The communications network 106 connects the clients 102-104 to a cloud-based content management system 108 (also referred to hereinafter as "cloud system 108"). Cloud system 108 includes a content item server 118 and a control server 120 connected to the communications network 106, content item storage servers 122-124, a user account database 126, a shared workspace metadata database 128, and a user event log 130.

The cloud system 108 provides content item management services to clients 102-104 including shared workspaces and selective content item synchronization as described below. It should be appreciated that the layout of the cloud system 108 is merely exemplary and may take on any other suitable layout or configuration. The cloud system 108 may be used to manage content items, such as billions of files or documents hosted by modern cloud-based content management systems.

A content item managed by cloud system 108 may be a logical collection of digital information including, but not limited to, a digital document, file, or other logical collection of digital information. Often, a content item corresponds to a known media type such as, for example, an image (e.g., JPEG, TIFF, GIF, etc.), music (e.g., .MP3, AIFF, M4A, WAV, etc.), a movie (e.g., MOV, MP4, M4V, etc.), a word processing document (e.g., DOC, DOCX, PAGES, etc.), other document (e.g., PDF, etc.), a spreadsheet document (e.g., XLS, XLSX, NUMBERS, etc.), a presentation document (e.g., PPT, PPTX, KEY, etc.), a web page (e.g., HTM, HTMLS, etc.), or a text file (e.g., TXT, RTF, etc.). However, a content item managed by cloud system 108 is not limited to being a particular media type, and the content item may encompass any logical collection of digital information including binary data, text data, or other digital information.

Note that the cloud system 108 can be used as an Internet content management service, for managing hosted content items over the Internet or other public network and/or as an intranet content management service, for managing hosted content items over a local area network (LAN) or other private network.

The cloud system 108 may include multiple data centers, each housing a backend. The data centers may be geographically dispersed from one another, such as across the continental United States. Network requests from one of the clients 102-104 to the cloud system 108 are routed to an appropriate backend, based on a variety of possible factors including, for example, the content, nature, or type of the request and/or geographic location of the network request.

Each backend preferably includes multiple control servers, such as control server 120, and/or multiple content item servers, such as content item server 118, each coupled to a communications network 106 via a respective network communication module (e.g., 132 or 136). The communications network 106 may be the Internet, but may also be any local area network (LAN) and/or wide area network (WAN).

In some embodiments, each content item server 118 and each control server 120 is a Web server that receives network requests from the client application 112 and delivers network responses to the client application 112 via HTTP, HTTPS or similar protocol. In essence, the content item servers, such as content item server 118, are configured to store and retrieve blocks of content items stored in storage servers 122-124 as requested by the client application 112. The control servers, such as control server 120, are configured to control the content item management process in conjunction with client application 112, including providing shared workspaces 114 and selectively synchronizing content items between cloud system 108 and clients 102-104 in conjunction with the client application 112 as described below.

The content item server 118 typically includes a network communication module 132 and a block request receipt, processing, and response module 134, connected to each other. The network communications module 132 connects the content item server 118 to the communication network 106 and enables receipt of communications from the communication network 106 and the provision of communications to the communication network 106 bound for the client 102 or other destinations. The block request receipt, processing, and response module 134 is primarily responsible for receiving requests for content item blocks, processing them and returning the requested blocks to the client 102 via the network communication module 132.

The storage servers 122-124 store content item blocks. Each content item block may contain all of or a portion of a content item managed by the cloud system 108. Each content item block may be a fixed size such as, for example, 4 Megabytes (MB). Depending on the size of the content item, the content item may be stored on one or more of the storage servers 122-124 in one or more content item blocks, with the last content item block potentially having less than the fixed block size amount of data.

Each content item block in the storage servers 122-124 may be identified by a cryptographic hash (e.g., SHA-256) of the block's contents. A content item stored in the storage servers 122-124 may be uniquely identified by a list of one or more cryptographic hashes identifying the one or more content item blocks in one or more of the storage servers 122-124 containing the content item's contents. This list is referred to hereinafter as the "blocklist" of the content item.

The block request receipt, processing, and response module 134 may receive, process, and respond to at least two different types of requests from the client application 112.

A first type of request is referred to as a "store" request. A store request may contain two lists. A first list contains one or more cryptographic hashes $H_1, H_2, \ldots H_N$. A second list contains one or more corresponding blocks of data $B_1, B_2, \ldots B_N$. That is, the cryptographic hash $H_i$ ($1 \leq i \leq N$) in the first list is computed from the corresponding block of data $B_i$ ($1 \leq i \leq N$) in the second list using a cryptographic or one way hash function (e.g., SHA-256 or the like). Upon receiving a store request, for each hash $H_i$ in the first list, block $B_i$ in the second list is stored in a content item block on a storage server 122 and the content item block (or a storage address thereof) is associated with hash $H_i$ in a key-value mapping maintained by the content item server 118. One or more store requests may be issued from the client application 112 to store a new content item or update an existing content item in the storage servers 122-124.

A second type of request that the block request receipt, processing, and response module 134 may receive and process is referred to as a "retrieve" request. A retrieve request may contain a list of one or more cryptographic hashes $H_1, H_2, \ldots H_N$ identifying one or more content item blocks to retrieve from the storage servers 122-124 and send to the requesting client application 112 over communication network 106. Upon receiving a retrieve request, for each hash value $H_i$ in the request, the key-value mapping maintained by the content item server 118 is consulted with the hash value $H_i$ to identify the content item block (or the storage address thereof) for the hash $H_i$ and the contents of the content item block are sent over communication network 106 to the requesting client application 112. One or more retrieve requests may be issued from the client application 112 to retrieve a content item from the storage servers 122-124.

The control server 120 typically includes a network communications module 136, a shared workspace metadata management module 138, a synchronization module 140, an event log module 142, and a notification module 144, all interconnected. The network communications module 136 connects the control server 120 to the communication network 106 and enables receipt of communications from the communication network 106 and the provision of communications to the communication network 106 bound for the client application 112 at a client 102 or other destinations.

The shared workspace metadata management module 138 (or just "management module 138") is primarily responsible for receiving requests to view or change (i.e., add, edit, or delete) shared workspace metadata in shared workspace metadata database 128, processing the requests, and returning a response to the requesting client 102 via the communication module 136.

The synchronization module 140 is primarily responsible for periodically synchronizing content items stored in shared workspaces 114 at clients 102-104 and/or synchronizing shared workspace metadata 116 stored at clients 102-104 with content items stored in storage servers 122-124 and/or shared workspace metadata stored in shared workspace metadata database 128.

The event log module 142 collects event items reflecting user interaction with shared workspaces 114 and the content items thereof at clients 102-104 and stores the event items in event log 130.

Notification module 144 notifies client application 112 at a client 102 (e.g., via HTTP long polling) when new synchronization updates are available for content items in the shared workspace 114 and/or the shared workspace metadata 116 at the client 102.

The user account database 126 stores information about users of the cloud system 108. Each user may have a record in account database 126. In some embodiments, a record for an account in the account database 126 includes all of the following information, or a subset or a superset thereof:

Account ID—A unique identifier of the account in the account database 126;

Authentication Credentials—Information such as, for example, a username and password, which may be used to authenticate a user of the account;

Linked Devices [Device $ID_1$, Device $ID_2$, . . . Device $ID_n$]—A list of one or more unique identifiers of clients 102-104 that are linked to this account. This list may also be empty if no clients 102-104 are currently linked to the account. A client 102 may be linked to the account in a variety of different ways. In one way, a user may link the client 102 to the account by successfully installing the client application 112 on the client 102 and successfully authenticating against the account from the client 102. For example, the user may successfully authenticate against the account by providing the Authentication Credentials of the account record to the control server 120 from the client 102. In some instances, the client 102 is not linked to the account until after both the user has successfully authenticated against the account from the client 102 and the client application 112 has successfully communicated with the control server 120 from the client 102; and Device-Shared Workspaces {Device $ID_j$, [Shared Workspace $ID_1$, Shared Workspace $ID_2$, . . . Shared Workspace $ID_n$]}—For each client 102 (Device $ID_j$) linked to the account in [Device $ID_1$, Device $ID_2$, . . . Device $ID_N$], a list of one of more identifiers of shared workspaces 114 that the client 102 has joined. A process for joining a client 102 to a shared workspace 114 is described below. Thus, a shared workspace 114 may exist at multiple clients 102-104 including at clients 102-104 belonging to different users.

The shared workspace metadata database 128 stores information about shared workspaces 114. According to some embodiments, the shared workspace metadata database 128 includes a content item journal. Each record in the content item journal represents a content item stored in the storage servers 122-124. In some embodiments, a journal record in the content item journal includes all of the following information, or a subset or a superset thereof:

Shared Workspace ID—An identifier of a shared workspace to which the content item belongs;

Shared Workspace Path—A file system-like path to the content item in the shared workspace. A shared workspace may organize content items according to a hierarchical tree-like arrangement. The tree may have a single root and be composed of one or more nodes one of which represents the root. Each of the nodes under the root (descendants of the root), if there are any, represents either a content item folder or a content item in the shared workspace. A content item folder is a named collection of one or more content items and/or other content item folders. However, a content item folder may be empty. Because content item folders can be nested in other content item folders, the tree may have multiple levels. Leaf nodes of the tree either represent an empty content item folder or a content item. For example, the shared workspace path "/Design/icons.psd" implies the tree has at least three nodes: the root node (represented by the first forward slash in the path), a node descending directly from the root node representing a content item folder named "Design," and a node descending directly from that node representing a content item named "icons.psd";

Blocklist [$H_1$, $H_2$, . . . $H_n$]—A list of cryptographic hashes, each identifying a content item block in the storage servers 122-124 containing data of the content item; and Journal ID—An ever-increasing value, unique at least within the shared workspace, that represents when the content item was created or last modified relative to other content items in the shared workspace.

According to some embodiments, the shared workspace metadata database 128 includes access control information for shared workspaces 114. The access control information may include a number of records. Each access control record may represent access controls on a content item folder or a content item in a shared workspace 114. In some embodiments, an access control record in the database 128 includes all of the following information, or a subset or a superset thereof:

Shared Workspace ID—An identifier of a shared workspace to which the content item or the content item folder belongs;

Shared Workspace Path—The file system-like path to the content item folder or the content item in the shared workspace; and Access Control List—A set of one or more access control items. Each access control item in the list specifies a user or a group of users and one or more permissions that apply to the user or group of users with respect to the content item or the content item folder. According to some embodiments, a given user has no permission with respect to a content item folder or a content item in a shared workspace unless there is an access control record in the database 128 granting one or more permissions to the user. According to some embodiments, the permissions that may be granted to a user or a group of users with respect to a content item folder or a content item in a content item namespace include all of the following, or a subset or a superset thereof:

Exist—The user can know about the existence of the content item folder or the content item through the folder or item's shared workspace path but cannot access the contents of the content item;

View—The user can open and access the contents of the content item folder or the content item but cannot modify the contents. Includes the Exist permission;

Modify—The user can modify the contents of the content item folder or the content item but cannot delete the content item folder or the content item. Includes the View permission; and Remove—The user can delete or remove the content item folder or the content item from the shared workspace. Includes the Modify permission.

The event log 130 stores event items. Each event item represents a user event that occurred at a client 102 with respect to a content item folder or a content item in a shared workspace 114. The event item may be generated by the client application 112 at the client 102 in response to detecting the user event. The generated event item may then be subsequently sent by the client application 112 to the control server 120 for processing by the event log module 142.

The detected user event may correspond to an action at the client 102 taken by a user on a content item folder or a content item of a shared workspace 114 at the client 102. The client application 112 may detect the user event via an application programming interface (API) offered by an operating system on the client 102. Such action may include, for example, creating, opening, modifying, or removing a content item folder in the shared workspace 114. Also with respect to a content item folder, such action may be copying or moving the content item folder from the shared workspace 114 to another location in the shared workspace 114 or to a location outside the shared workspace 114 at the client 102. Similarly, with respect to a content item in a shared workspace 114 at a client 102, an action at the client 102 by a user corresponding to an event item in event log 130 may include creating, opening, modifying, removing, copying, or moving the content item at the client 102.

In some embodiments, fewer and/or additional modules, functions, or databases are included in cloud system 108. The modules shown in FIG. 1 as being part of cloud system 108 represent functions performed in an exemplary embodiment.

Although FIG. 1 portrays discrete blocks, the figure is intended more as a functional description of some embodiments of the invention rather than a structural description of the functional elements. One of ordinary skill in the art will recognize that an actual implementation might have the functional elements grouped or split among various components. For example, the shared workspace metadata database 128 may be part of a combination synchronization 140 and notification module 144. Similarly, the journal item journal and the access control information described above as being stored in shared workspace metadata database 128 may instead be stored in separate databases. Moreover, one or more blocks in FIG. 1 may be implemented on one or more servers designed to provide the described functionality. Further, although the description herein refers to certain features implemented in the client 102 and certain features implemented in the cloud system 108, the embodiments of the invention are not limited to such distinctions. For example, features described herein as being part of the cloud system 108 could be implemented in whole or in part in the client 102, and vice versa.

In accordance with some embodiments, clients 102-104 and cloud system 108 are implemented on one or more conventional computing devices. Such a computing device may take various different forms including, but not limited to, a client computer, a server computer, a network device, a mobile computing device, a cell phone, a smart phone, a tablet computer, a laptop computer, a desktop computer, a workstation computer, a personal digital assistant, a blade server, a mainframe computer, a set-top device, a gaming console, an in-vehicle computer, or other type of computing device.

Example Basic Hardware

Figure 2:
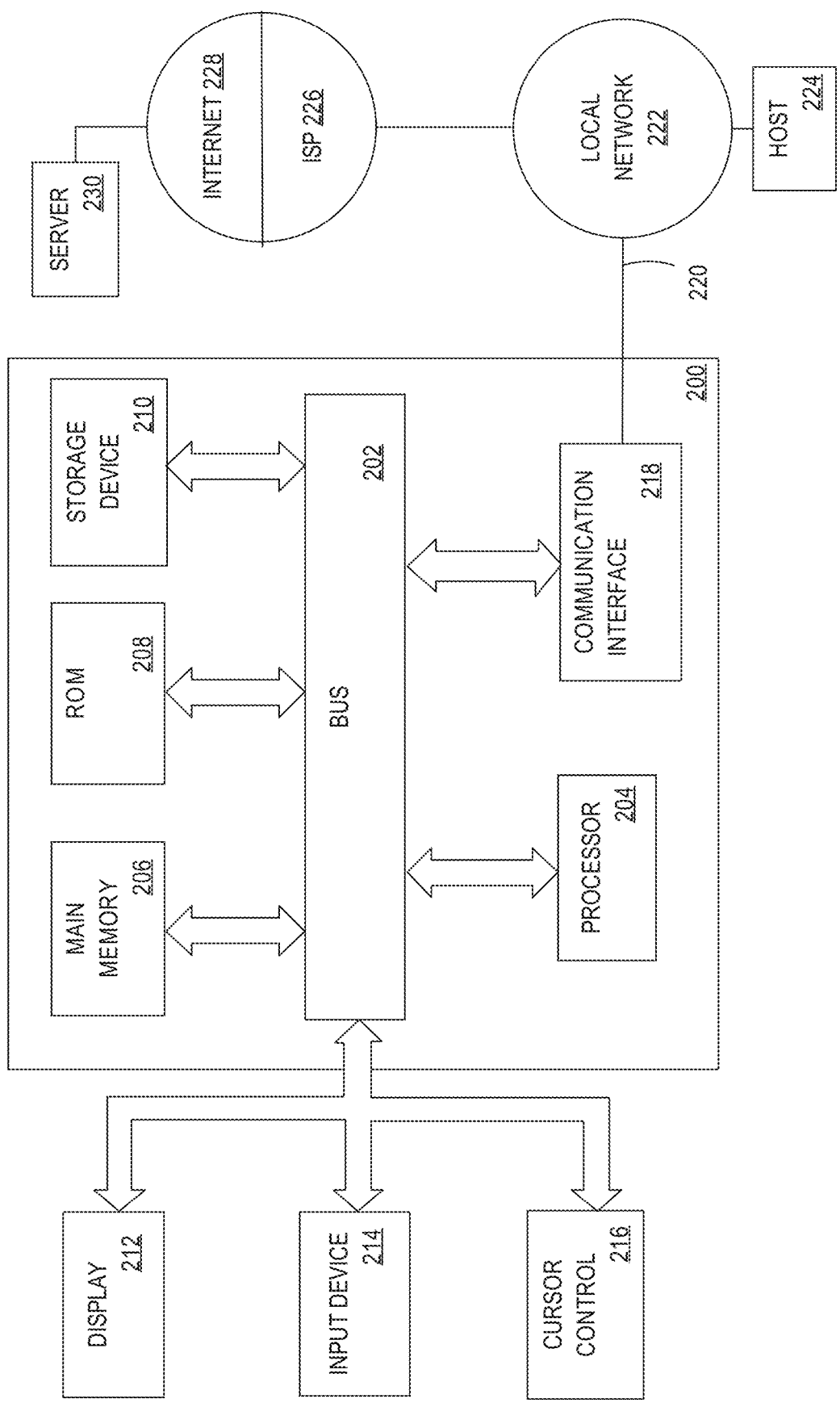
FIG. 2 is a block diagram illustrating an example computing device suitable for implementing embodiments of the present invention.

Referring now to FIG. 2, it is a block diagram that illustrates an example computing device 200. Computing device 200 and its components, including their connections, relationships, and functions, is meant to be exemplary only, and not meant to limit implementations of the present invention. Other computing devices suitable for implementing the present invention may have different components, including components with different connections, relationships, and functions.

Computing device 200 may include a bus 202 or other communication mechanism for addressing main memory 206 and for transferring data between and among the various components of device 200.

Computing device 200 may also include one or more hardware processors 204 coupled with bus 202 for processing information. A hardware processor 204 may be a general purpose microprocessor, a system on a chip (SoC), or other processor suitable for implementing the present invention.

Main memory 206, such as a random access memory (RAM) or other dynamic storage device, also may be coupled to bus 202 for storing information and instructions to be executed by processor(s) 204. Main memory 206 also may be used for storing temporary variables or other intermediate information during execution of software instructions to be executed by processor(s) 204. Such software instructions, when stored in non-transitory storage media accessible to processor(s) 204, render computing device 200 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, Javascript, web pages, web applications, plugins, embedded software, microcode, compilers, debuggers, interpreters, virtual machines, linkers, and text editors.

Computing device 200 also may include read only memory (ROM) 208 or other static storage device coupled to bus 202 for storing static information and instructions for processor(s) 204.

One or more mass storage devices 210 may be coupled to bus 202 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 210 (e.g., the main hard disk for the device) stores a body of program and data for directing operation of the computing device, including an operating system, user application programs, driver and other support files, as well as other data files of all sorts.

Computing device 200 may be coupled via bus 202 to display 212, such as a liquid crystal display (LCD) or other electronic visual display, for displaying information to a computer user. In some configurations, a touch sensitive surface incorporating touch detection technology (e.g., resistive, capacitive, etc.) may be overlaid on display 212 to form a touch sensitive display for communicating touch gesture (e.g., finger or stylus) input to processor(s) 204.

An input device 214, including alphanumeric and other keys, may be coupled to bus 202 for communicating information and command selections to processor 204. In addition to or instead of alphanumeric and other keys, input device 214 may include one or more physical buttons or switches such as, for example, a power (on/off) button, a "home" button, volume control buttons, or the like.

Another type of user input device may be a cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

While in some configurations, such as the configuration depicted in FIG. 2, one or more of display 212, input device 214, and cursor control 216 are external components (i.e., peripheral devices) of computing device 200, one or more of display 212, input device 214, and cursor control 216 are integrated as part of the form factor of computing device 200 in other configurations.

Functions of the disclosed systems, methods, and modules may be performed by computing device 200 in response to processor(s) 204 executing one or more programs of software instructions contained in main memory 206. Such instructions may be read into main memory 206 from another storage medium, such as storage device(s) 210. Execution of the software program instructions contained in main memory 206 cause processor(s) 204 to perform the functions of the disclosed systems, methods, and modules.

While in some implementations, functions of the disclosed systems and methods are implemented entirely with software instructions, hard-wired or programmable circuitry of computing device 200 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor(s) 204 for execution. For example, the instructions may initially be carried on a magnetic disk or solid-state drive of a remote computer. The remote computer can load the instructions into its dynamic memory and send the instructions over a telephone line using a modem. A modem local to computing device 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor(s) 204 retrieves and executes the instructions. The instructions received by main memory 206 may optionally be stored on storage device(s) 210 either before or after execution by processor(s) 204.

Computing device 200 also may include one or more communication interface(s) 218 coupled to bus 202. A communication interface 218 provides a two-way data communication coupling to a wired or wireless network link 220 that is connected to a local network 222 (e.g., Ethernet network, Wireless Local Area Network, cellular phone network, Bluetooth wireless network, or the like). Communication interface 218 sends and receives electrical, electromagnetic, or optical signals that carry digital data streams representing various types of information. For example, communication interface 218 may be a wired network interface card, a wireless network interface card with an integrated radio antenna, or a modem (e.g., ISDN, DSL, or cable modem).

Network link(s) 220 typically provide data communication through one or more networks to other data devices. For example, a network link 220 may provide a connection through a local network 222 to a host computer 224 or to data equipment operated by an Internet Service Provider (ISP) 226. ISP 226 in turn provides data communication services through the world wide packet data communication network now commonly referred to as the "Internet" 228. Local network(s) 222 and Internet 228 use electrical, electromagnetic or optical signals that carry digital data streams. The signals through the various networks and the signals on network link(s) 220 and through communication interface(s) 218, which carry the digital data to and from computing device 200, are example forms of transmission media.

Computing device 200 can send messages and receive data, including program code, through the network(s), network link(s) 220 and communication interface(s) 218. In the Internet example, a server 230 might transmit a requested code for an application program through Internet 228, ISP 226, local network(s) 222 and communication interface(s) 218.

The received code may be executed by processor 204 as it is received, and/or stored in storage device 210, or other non-volatile storage for later execution.

Example Basic Software

Figure 3:
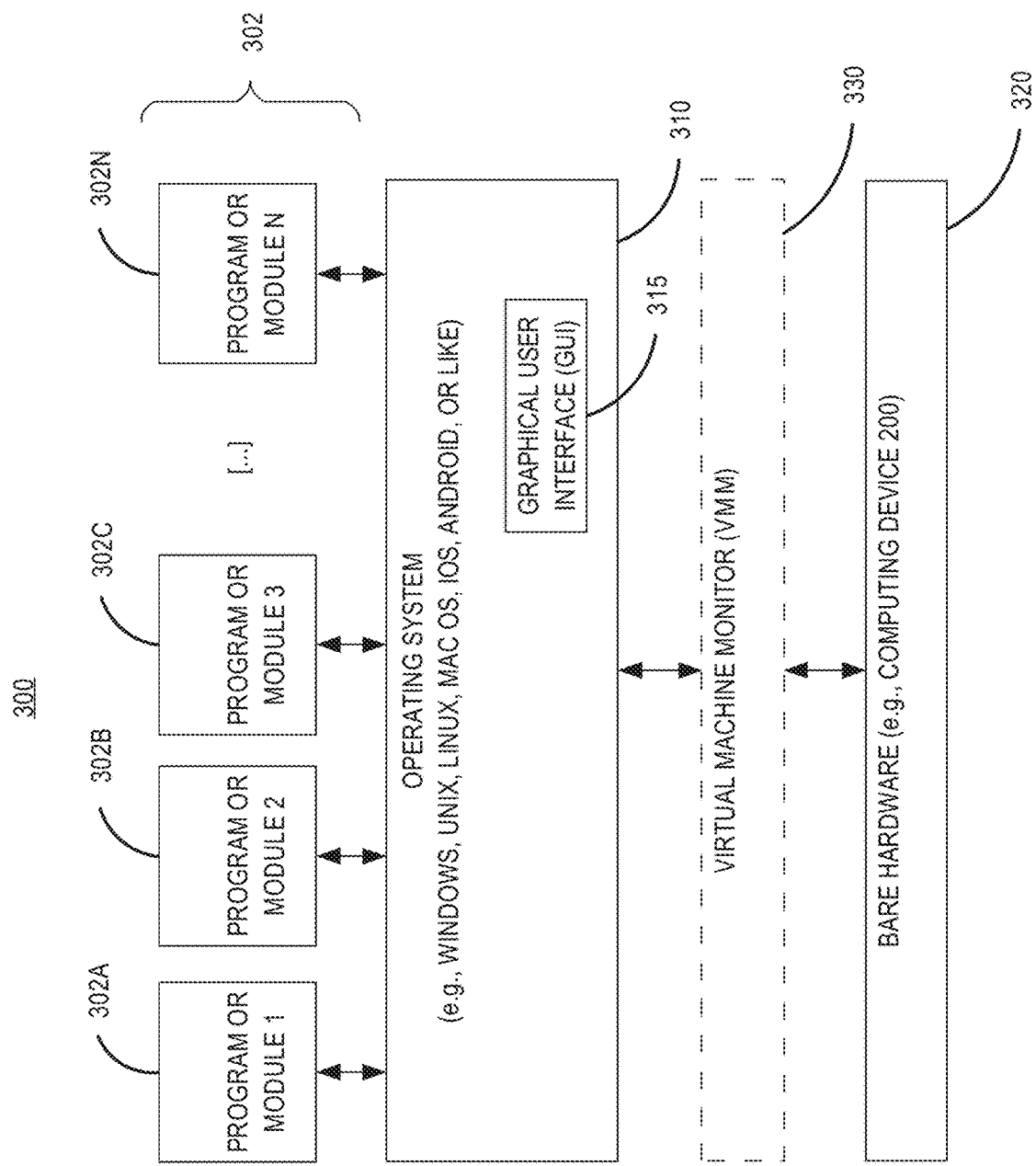
FIG. 3 is a block diagram illustrating an example software system that may be employed for controlling the operation of the computing device of FIG. 2.

FIG. 3 is a block diagram of an example software system 300 that may be employed for controlling the operation of computing device 200. As shown, a computer software system 300 is provided for directing the operation of computing device 200. Software system 300, which may be stored in system memory (RAM) 206 and on fixed storage (e.g., hard disk) 210, includes a kernel or operating system (OS) 310. The OS 310 manages low-level aspects of computer operation, including managing execution of processes, memory allocation, file input and output (I/O), and device I/O. One or more application programs (e.g., client application 112 of FIG. 1) or modules (e.g., 132, 134, 136, 138, 140, 142, and 144 of FIG. 1), represented as 302A, 302B, 302C . . . 302N in FIG. 3, may be "loaded" (i.e., transferred from fixed storage 310 into memory 306) for execution by the system 400. The applications or other software intended for use on device 300 may also be stored as a set of downloadable computer-executable instructions, for example, for downloading and installation from an Internet location (e.g., Web server).

Software system 300 may include a graphical user interface (GUI) 315, for receiving user commands and data in a graphical (e.g., "point-and-click" or "touch gesture") fashion. These inputs, in turn, may be acted upon by the system 300 in accordance with instructions from operating system 310 and/or client application module(s) 302. The GUI 315 also serves to display the results of operation from the OS 310 and application(s) 302, whereupon the user may supply additional inputs or terminate the session (e.g., log off).

OS 310 can execute directly on the bare hardware (e.g., processor(s) 204) 320 of device 200. Alternatively, a hypervisor or virtual machine monitor (VMM) 330 may be interposed between the bare hardware 320 and the OS 310. In this configuration, VMM 330 acts as a software "cushion" or virtualization layer between the OS 310 and the bare hardware 320 of the device 100.

VMM 330 instantiates and runs virtual machine instances ("guest machines"). Each guest machine comprises a "guest" operating system, such as OS 310, and one or more applications, such as applications 302, designed to execute on the guest operating system. The VMM 330 presents the guest operating systems with a virtual operating platform and manages the execution of the guest operating systems.

In some instances, the VMM 330 may allow a guest operating system to run as if it is running on the bare hardware 320 of device 200 directly. In these instances, the same version of the guest operating system configured to execute on the bare hardware 320 directly may also be able to execute on VMM 330 without modification or reconfiguration. In other words, VMM 330 may provide full hardware and CPU virtualization to a guest operating system in some instances.

In other instances, a guest operating system may be specially designed or configured to execute on VMM 330 for efficiency. In these instances, the guest operating system is "aware" that it executes on a virtual machine monitor. In other words, VMM 330 may provide para-virtualization to a guest operating system in some instances.

The above-described computer hardware and software is presented for purpose of illustrating example underlying computer components that may be employed for implementing the present invention. The present invention, however, is not necessarily limited to any particular computing environment or computing device configuration. Instead, the present invention may be implemented in any type of system architecture or processing environment capable of supporting the features and functions of the disclosed systems and methods.

Shared Workspaces and Selective Content Item Synchronization

Historically, existing cloud-based content management systems have been adequate at keeping personal content items in sync between a user's multiple devices. For example, with existing systems, user A could create or modify a document on a laptop device linked to the system and that update is automatically replicated through the system to user A's other linked devices such that all of the copies of the document at all of the linked devices are identical after the update is applied at all of the other linked devices as part of synchronization operations between the devices and the system.

In the business context, content items created by employees generally belong to the business and not the employees themselves. Further, businesses historically have viewed their content items as being centralized such as on a file server as opposed to being distributed among many personal computing devices. This centralized view made is easier for a business to segregate personal content items from content items belonging to the business. For example, an IT manager or administrator for a business could safely assume that all content items stored on the file server belong to the business. Further, owing to the centralized nature of the content items, it was easier for the business to control access to content items. For example, the IT manager or administrator can set access control permissions on content items stored on the company file server. Also, in many cases, the lifetime of content items belonging to the business exceeds the length of employment of any given employee. By storing content items belonging to it on a centralized file server, the business can provision access to content items to new employees simply by setting the appropriate access control permissions on the content items in the file server. Similarly, the business can revoke access to content items on the file server from departing employees simply by changing the access control permissions to revoke access. From the perspective of the business, the file server is viewed as the centralized repository for the business's content items that exist over time as employees come and go.

With some existing cloud-based content management systems, the content item storage model is less centralized than the traditional file server model. In particular, with these systems, each user of the system has their own individual synchronization repository on their personal computing device where content items synchronized with the system are stored. Further, each user maintains their individual synchronization repository independently of each other. For example, with existing systems, user Alice's synchronization repository may not provide any inherent visibility into user Bob's synchronization repository. In particular, user Alice may not know what content items are stored in user Bob's synchronization repository, and vice versa. Some existing systems provide mechanisms to share selected content items between synchronization repositories. For example, with some existing systems, user Alice can share a folder in her synchronization repository with user Bob such that updates Bob makes to the shared folder in his synchronization repository are seen by Alice in her synchronization repository, and vice versa. However, with existing systems, ownership of the shared folder is tied to an individual. This is problematic if Alice leaves the company and decommissions her synchronization repository or simply deletes the shared folder from her synchronization repository. In this case, the folder she shared with Bob may no longer be accessible to Bob. In the worst case, all of the work accumulated in the shared folder is lost.

Another problem with shared folders on existing systems is that hierarchical information pertaining to the shared folder may be lost when the shared folder is incorporated into another's synchronization repository. For example, assume Alice has a folder in her synchronization repository with the path /A/B/C. With existing systems, if user Alice shares folder /A/B/C with user Bob, the folder appears as /C in Bob's synchronization repository with the hierarchical information about parent folders "A" and "B" lost. This is problematic, especially if the names of the parent folders convey information about what is stored in the shared folder. Overall, existing cloud-based content management systems, due to the individualized and distributed nature of synchronization repositories, increase coordination costs for a business when used for managing and storing content items belonging to the business.

According to some embodiments, cloud system 108 and client application 112 provides shared workspaces 114 to users of clients 102-104. At the highest level, a shared workspace is a named collection of content items arranged according to a content item folder hierarchy with access controls that control access to content items in the shared workspace by users.

According to some embodiments, only a subset of the content items in a shared workspace are stored at a client 102 at any given time.

According to some embodiments, the user can browse the content item folder hierarchy of the shared workspace at a client 102 using a file system browser provided by an operating system of the client 102 (e.g., the finder on MAC OS devices or the WINDOWS EXPLORER on WINDOWS devices).

According to some embodiments, after a client 102 is joined to a shared workspace, an actionable icon appears in the GUI 110 at the client 102. For example, the icon may appear on the desktop of the GUI 110 provided by an operating system on the client 102. The user may interact with the icon (e.g., double-click on the icon) to open a file explorer like-view of the content item hierarchy of the shared workspace. Further, an icon or other indication of the shared workspace may also be displayed with other shared resources in an interface provided by the operating system on the client 102. For example, an actionable icon or text may be listed in the GUI 110 along with mounted drives, shared drives, network drives, or other connected resources. By doing so, the user can access the shared workspace from a familiar location where the user knows to access other connected resources such as mounted drives, external disks, and network drives.

According to some embodiments of the present invention, a shared workspace, as specified by shared workspace metadata in shared workspace metadata database 128, encompasses all of the following, or a subset or a superset thereof:

One or more content items stored in storage services 122-124;

A shared workspace content item hierarchy which specifies shared workspace paths to the content items contained in the shared workspace and specifies shared workspace paths to any empty content item folders contained in the shared workspace; and Access control lists on content items and content item folders contained in the shared workspace.

According to some embodiments of the present invention, when a user joins a client 102 to a shared workspace 114, only shared workspace metadata 116 for the shared workspace 114 is automatically downloaded from cloud system 108 and stored at the client 102. However, all of the content items contained in the shared workspace 114 are not automatically downloaded, at least not in response to joining the client 102 to the shared workspace 114. By doing so, the user can join the client 102 to the shared workspace 114 more quickly because at least some of the content items in the shared workspace 114 are not downloaded to the client 102 over the communications network 106 from the content item server 118. Further, this allows the user to join the client 102 to the shared workspace 114 even if the amount of available storage space at the client 102 is less than the amount that would be needed to store most or all of the content items that belong to the shared workspace 114. Also, at the same, the client 102 obtains from the cloud system 108 shared workspace metadata 116 that can be used by the client application 112 at the client 112 to provide a representation of the shared workspace 114 in a GUI 110 presented at the client 102. In some embodiments, the GUI 110 that is presented includes a user browse-able and interactive representation of the content item hierarchy of the shared workspace 114.

Figure 4A:
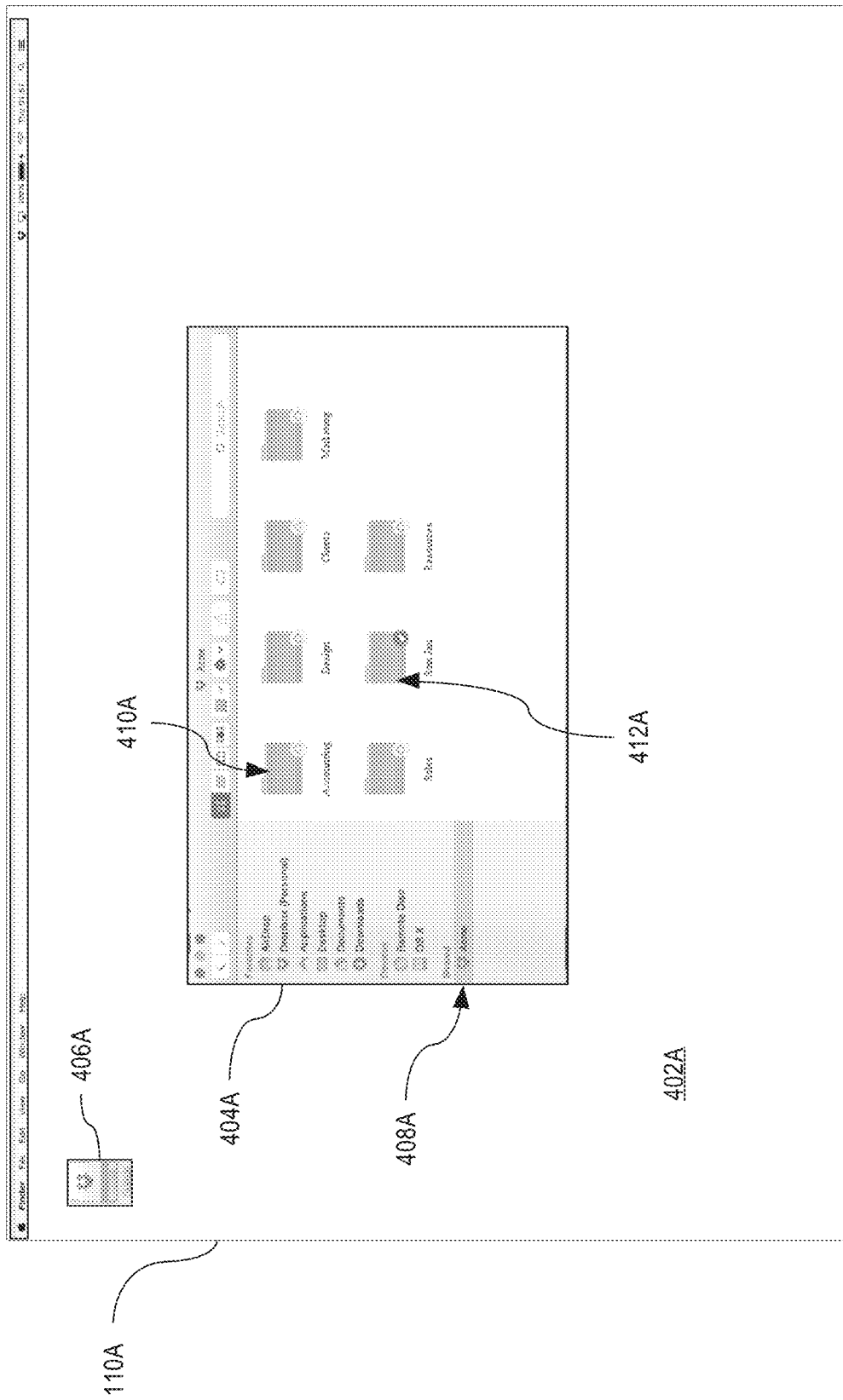
FIG. 4A depicts a graphical user interface in accordance with an embodiment of the invention.

FIG. 4A depicts an example GUI 110A presented at client 102 after the client 102 has been successfully joined to a shared namespace 114 named "Acme". The GUI 110A includes a desktop 402A, a content item browser 404A, and a shared workspace launcher icon 406A. The desktop 402A may be presented by an operating system (e.g., 310) of the client 102. The content item browser 404A and the shared workspace launcher icon 406A may be presented by a combination of the operating system and the client application 112.

According to some embodiments, when a client 102 has joined a shared workspace, the shared workspace 114 on the client 102 appears as a mounted drive, disk, or device or a shared resource in a file system browser provided by an operating system of the client 102. For example, the "Acme" shared workspace 114 appears in content item browser 404A as a shared resource 408A, which is currently selected, as indicated with highlighting. By doing this, integration of the shared workspace 114 into the desktop 402A environment is more seamless based on the user's prior familiarity with the file system browser. If the user has joined the client 102 to more than one shared workspace 114, then multiple shared workspaces may appear as a shared resource (like shared resource 408A for the "Acme" shared workspace 114) in the file system browser 404A.

As mentioned, according to some embodiments, when a client 102 is joined to a shared workspace 114, all of the content items belonging to the shared workspace 114 may not be automatically download from the content item server 118 to the client 102. However, shared workspace metadata 116 for the shared workspace 114 may be automatically downloaded from the control server 120 to the client 102. By doing so, the client application 112 can provide a representation of the shared workspace 114 in the GUI 110 presented at the client 102.

For example, content item browser 404A includes a plurality of folder icons. Each folder icon (e.g., 410A) represents a content item folder at the root of, or contained in another content item folder of, the content item hierarchy of the "Acme" shared workspace 114. Each folder icon (e.g., 410A) includes a synchronization configuration status icon which indicates a current synchronization configuration with respect to the corresponding content item folder.

According to some embodiments, there are at least two different synchronization configuration status icons corresponding to two different synchronization configurations. One configuration status icon represents that the contents of the content item folder are currently configured for cloud-access only. That is, the contents of the content item folder is not stored locally at the client 102. In the example of FIG. 4A, the synchronization configuration status icon that represents this configuration has the appearance of a cloud. For example, a cloud icon appears in conjunction with the "Accounting" content item folder 410A to indicate that the contents of that content item folder are not stored locally at the client 102. Another configuration status icon represents that the contents of the content item folder are currently available for offline access. That is, the contents of the content item folder is stored locally at the client 102. In the example of FIG. 4A, the icon representing this configuration has the appearance of a checkmark. For example, a checkmark appears in conjunction with the "Sam Jau" content item folder 412A to indicate that the contents of that folder are stored locally at the client 102 and thus available for access even when the client 102 is not connected to communication network 106.

By viewing the synchronization configuration status icons, the user can quickly discern whether the contents of a corresponding content item folder is available for offline access at the client 102. The same or similar icons may also be used to represent the current synchronization configuration status of a content item, as opposed to a content item folder.

In some embodiments, the current synchronization configuration status of a content item folder or a content item in a shared workspace 114 is stored as part of the shared workspace metadata 116 for the shared workspace 114 at the client 102. According to some embodiments, the user may interact with the GUI 110 at the client 102 to change the current synchronization configuration status of a selected content item folder or a selected content item. According to some embodiments, if the synchronization configuration status for a content item folder or a content item is changed from cloud-access to offline-access, then the client application 112 downloads the content item folder or the content item from the content item server 118 to the client 102 in response to detecting the change. Thereafter, so long as the synchronization configuration status for the content item folder or the content item remains offline-access, the client application 112 will keep the content item folder or the content item in sync with the current version of the content item folder or the content item in the cloud system 108. Such synchronization between the client 102 and the cloud system 108 may occur asynchronously or periodically, however. Therefore, there may be brief periods of time between synchronization operations in which the content item folder or the content item at the client 108 is out-of-sync with respect to the current content item folder or the content item at the cloud system 108 despite the content item folder or the content item being configured at the client 102 for offline-access.

Figure 4B:
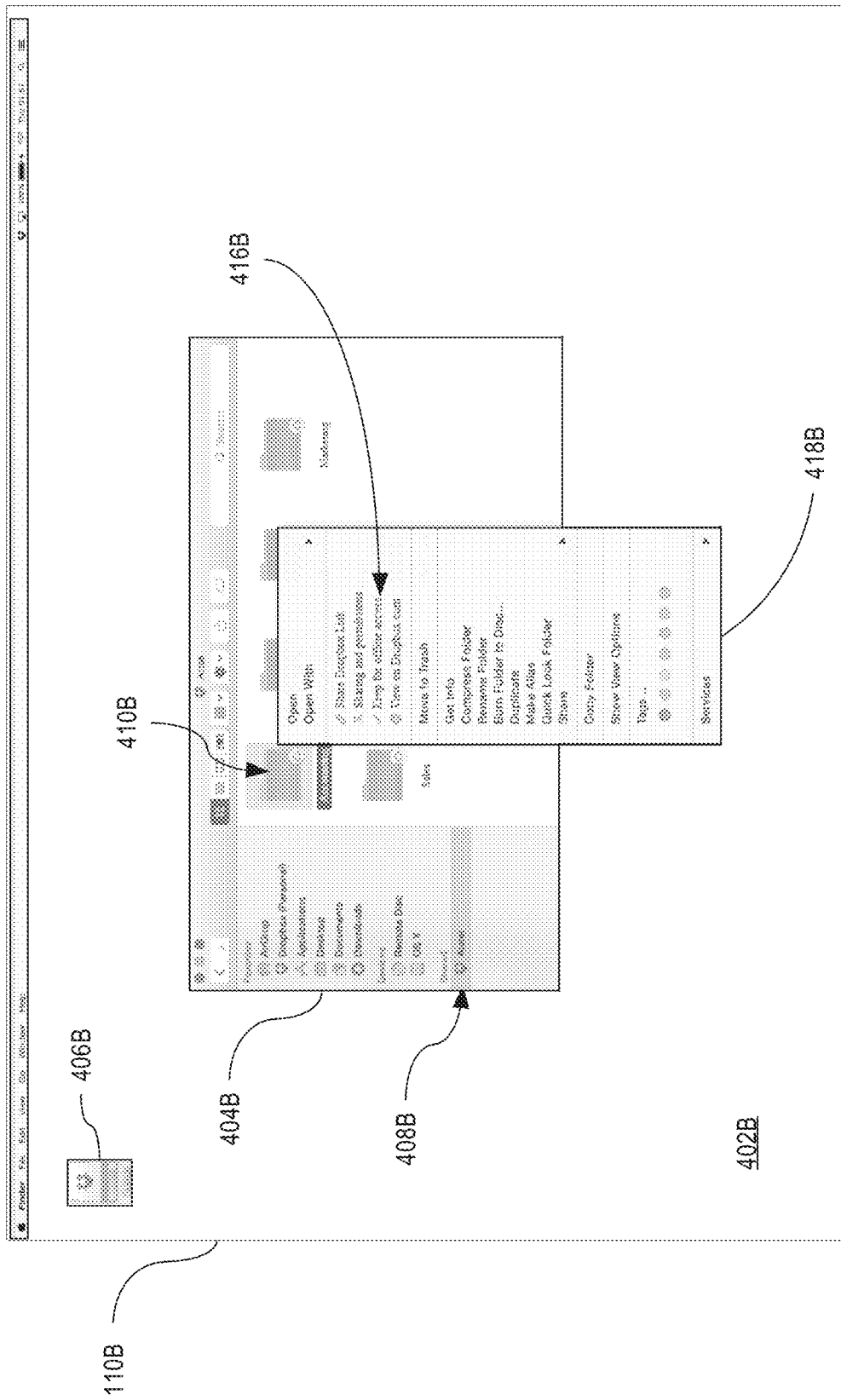
FIG. 4B depicts a graphical user interface in accordance with an embodiment of the invention.

For example, in FIG. 4B, the user has right-clicked on the "Accounting" folder icon 410B. In response a pop-up menu 418B is displayed in GUI 110B. The menu 418B provides the option 416B to change the current synchronization configuration status for the "Accounting" content item folder from cloud-access to offline-access.

Figure 4C:
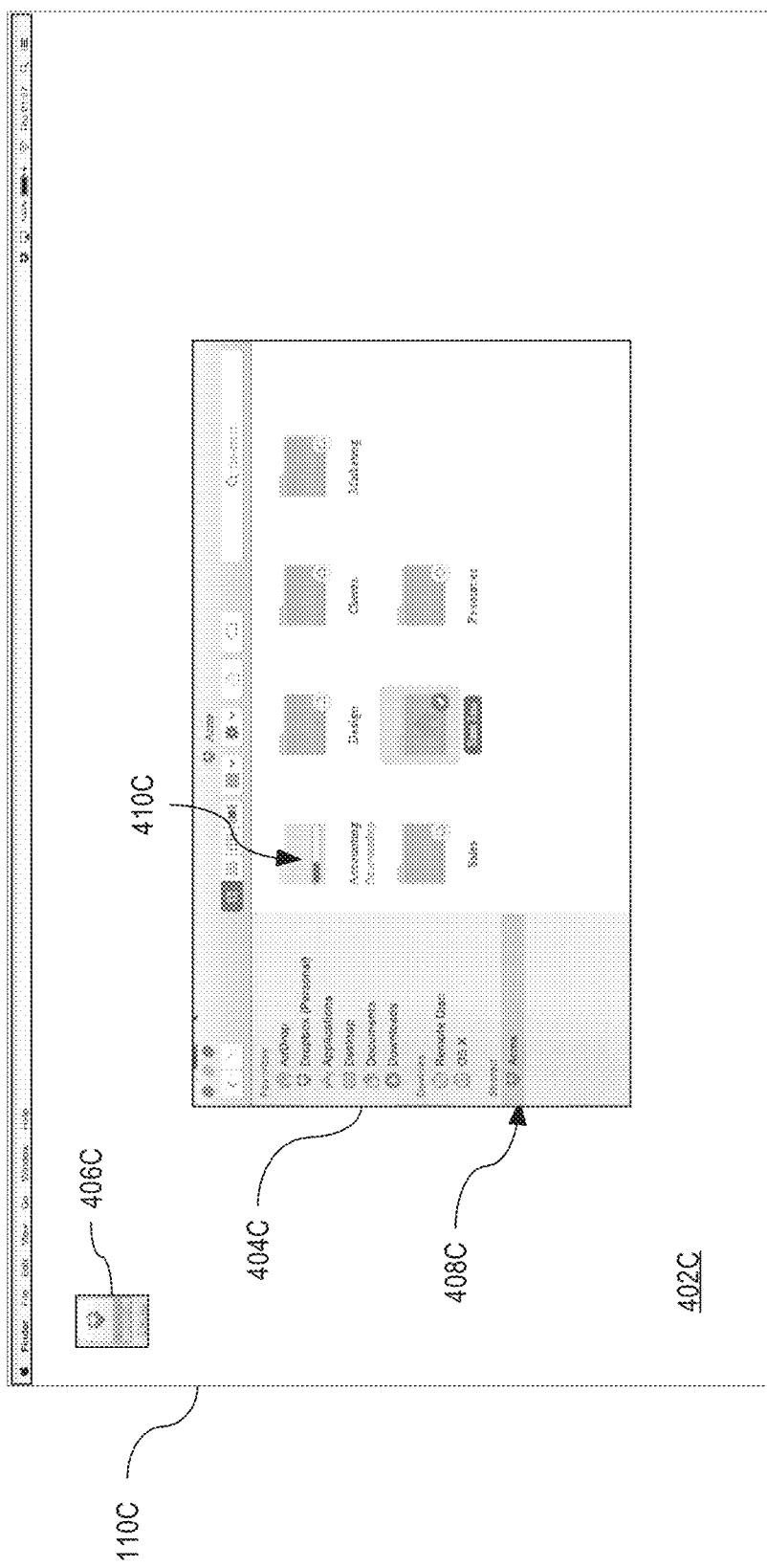
FIG. 4C depicts a graphical user interface in accordance with an embodiment of the invention.
Figure 4D:
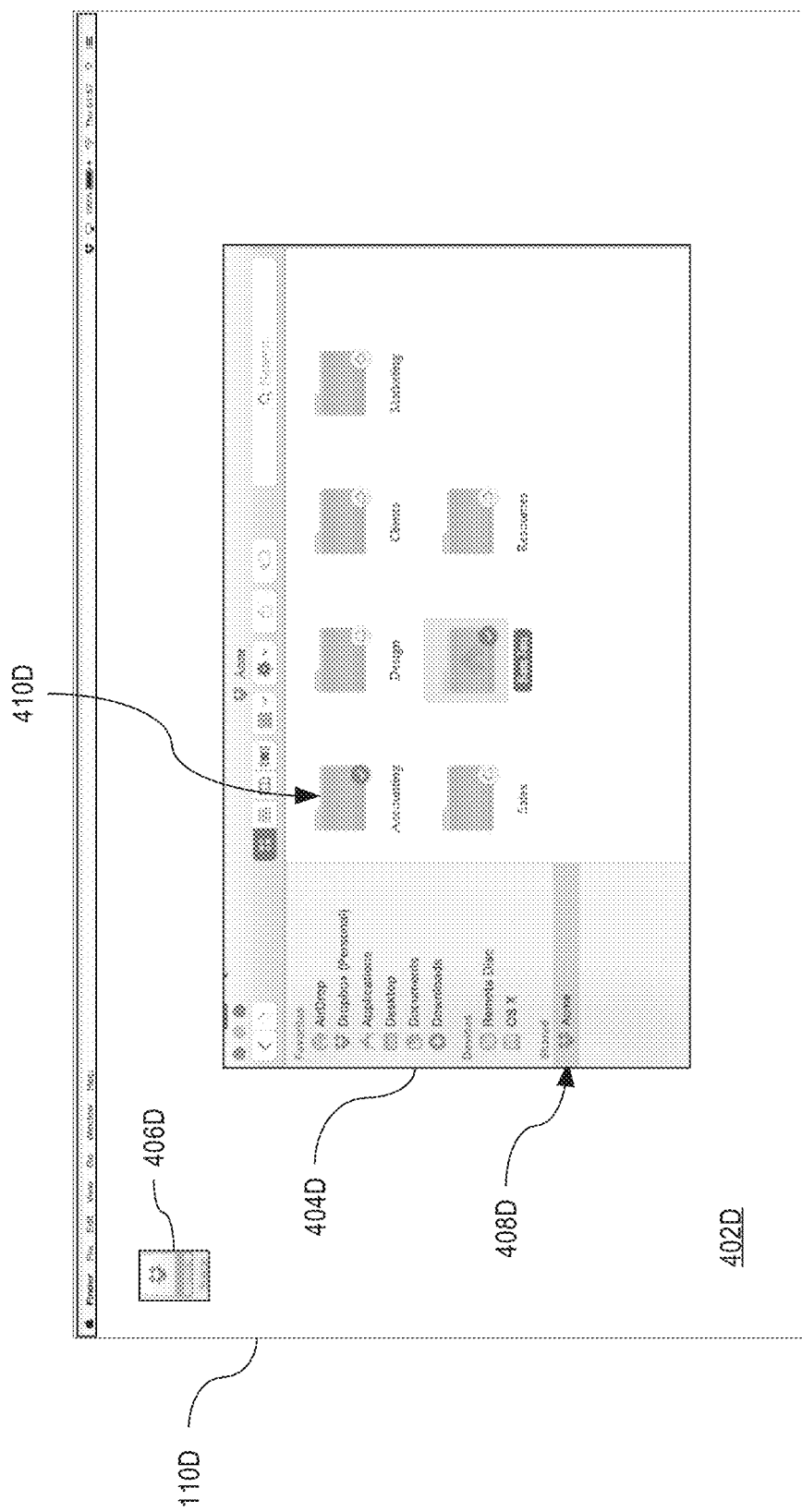
FIG. 4D depicts a graphical user interface in accordance with an embodiment of the invention.

In response to selecting option 416B, the contents of the "Accounting" content item folder are downloaded to the client 102 from content item server 118 as shown 410C in FIG. 4C. After the contents of the "Accounting" content item folder has finished downloading to the client 102, the synchronization configuration status icon changes to indicate that the contents are now available for offline access. For example, FIG. 4D shows the folder icon 410D now with a checkmark to indicate that the contents of the "Accounting" content item folder is now configured for offline-access.

According to some embodiments, content items in the shared workspace can also be configured for cloud-access or offline-access. If a content item is configured for cloud-access and the user opens the content item, then the content item may be downloaded automatically to the client 102 before it is opened at the client 102. Thereafter, the content item may be configured for offline-access and that configuration indicated as such in the GUI 110 (e.g., with a checkmark). In other words, the user's request to open the content item locally at the client 102 may be interpreted as a request to change the synchronization configuration from cloud-access to offline-access. In some embodiments, the synchronization configuration status is only changed if the user takes some other action in addition to opening the content item. For example, the synchronization configuration status may be automatically changed from cloud-access to offline-access if the user both opens the content item and edits the content item or opens the content item multiple times within a threshold period of time (e.g., 24 hours). In the case where the synchronization configuration status is not changed from cloud-access to offline-access when the user merely opens the content item, the content item is still downloaded to the client 102 and may be cached at the client 102 for some time in anticipation of possible subsequent access by the user. However, the synchronization configuration status icon of the content item in the GUI 110 may continue to indicate cloud-access (e.g., with a cloud icon).

According to some embodiments, the client application 112 detects when the amount of local storage space (e.g., hard disk space) at the client 102 occupied by content items in a shared workspace that are configured for offline-access exceeds a threshold or a threshold percentage. In response to exceeding the threshold, the client application 112 may prompt the user to change the synchronization configuration status of one or more content items that are currently configured for offline-access to cloud-access. At the same time, the client application 112 may delete the content item at the client 102 so as to free up storage resources.

When a user makes a local change to a content item in the shared workspace at the client 102, the client application 112 automatically replicates the change to the cloud system 108 for application to the copy of the content item stored in storage servers 122-124.

According to some embodiments, when a user opens a content item folder configured for cloud-access, the content item folder is opened but the contents of the content item folder are not automatically downloaded from the cloud system 108 as with opened content items. Further, unlike with opened content items, the synchronization configuration status of the opened content item folder remains as cloud-access.

According to some embodiments, one or more content item folders in a shared workspace are preconfigured for offline-access. As a result, upon joining the shared workspace, the contents of these content item folders are automatically downloaded to the client 102.

According to some embodiments, the user at the client 102 can view the access controls set on a content item folder or a content item in the GUI 110. For example, the user may right-click on an icon representing a content item folder or a content item displayed in the GUI 110 may cause a pop-up menu to be displayed. From the pop-up menu the user may select an option that displays the current access control set on the corresponding content item folder or content item.

According to some embodiments, the icon representing a content item folder or a content item of a shared workspace displayed in the GUI 110 indicates who has access to the content item folder or the content item. For example, one icon may indicate that a subset of a set of users has access to the content item folder or the content item and another icon may indicate that at least one user not in the set of users has access to the content item folder or the content item. By doing so, the user can quickly obtain by viewing the icon represented the folder or the content item whether access to the content item folder or the content item is restricted to a subset of the set of users or is accessible outside the set of users.

According to another embodiment, the icon that represents a content item folder or a content item can convey one of the three states with respect to who has access to the content item folder or the content item according to the access controls set on the content item folder or the content item. One icon state conveys that a subset of a set of users has access to the content item folder or the content item, a second icon state conveys that at least one user not in the set of users has access to the content item folder or the content item, and a third state conveys that exactly the set of users has access to the content item folder or the content item. The set of users may be, for example, the set of users that have been invited to join the shared workspace or the set of users that have joined at least one device to the shared workspace.

According to some embodiments, storage space permitting at the client 102, the client application 112 will automatically download (pre-fetch) a content item in a shared workspace from the cloud system 108 to the client 112 in expectation that the content item will soon be accessed at the client 102. The client application 112 may do this even when the content item is configured for cloud-access. Some of the reasons the client application 112 may pre-fetch a content item is because the content item or a related content item has recently been modified at another client 104. In this case, the notification module 144, upon detecting the modification to the content item or the related content item, may signal the client application 112 at the client 102 to download the content item (or a portion thereof) from the content item server 118 to the client 102. In this case, the icon displayed in the GUI 110 for the content item may remain as cloud-access in case the content item is subsequently removed from the content item cache at the client 102.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A computer-implemented method, comprising:
   at a personal computing device comprising one or more processors and storage media storing one or more computer programs executed by the one or more processors to perform the method, performing operations comprising:
   receiving content item metadata indicating a content item-folder hierarchy for a plurality of content items from a server of a cloud-based content management system;
   wherein the plurality of content items is hosted with the cloud-based content management system;
   wherein the plurality of content items is associated with a shared workspace to which the personal computing device is joined;
   after the receiving the content item metadata, using the content item metadata to display actionable graphical user interface icons for the plurality of content items according to the content item-folder hierarchy;
   wherein each actionable graphical user interface icon displayed corresponds to one of the plurality of content items and is configured to indicate at most one of the following content item states for the corresponding content item when displayed: that the corresponding content item is currently configured for offline access at the personal computing device, or that the corresponding content item is currently configured for cloud access from the personal computing device;
   wherein the actionable graphical user interface icon displayed corresponding to a particular content item of the plurality of content items is configured to indicate that the particular content item is currently configured for cloud access from the personal computing device; and
   while maintaining the configuration of the actionable graphic user interface icon to indicate that the particular content item is currently configured for cloud access from the personal computing device, and in response to a first request to open the particular content item configured for cloud access, downloading the particular content item to a content item cache at the personal computing device from one or more servers of the cloud-based content management system;

responsive to receiving an action to open and view without editing the particular content item downloaded in response to the first request to open, updating display of the actionable graphical user interface icon corresponding to the particular content item to indicate that the particular content item is currently configured for offline access, wherein the action to open and view without editing is received within a threshold period of time of the first request to open.

2. The computer-implemented method of claim 1, further comprising:

in response to the personal computing device being joined to the shared workspace, downloading some but not all of the plurality of content items from one or more servers of the cloud-based content management system.

3. The computer-implemented method of claim 1, wherein the personal computing device is a first personal computing device, the method further comprising:

based on a modification to a second particular content item of the plurality of content items at a second personal computing device that is not the first personal computing device, receiving a notification from a server of the cloud-based content management system; and while maintaining the configuration of the actionable graphic user interface icon to indicate that the second particular content item is currently configured for cloud access from the first personal computing device, and automatically based on the receiving the notification, downloading the second particular content item to the content item cache at the first personal computing device from one or more servers of the cloud-based content management system.

4. The computer-implemented method of claim 1, wherein the content item metadata specifies, for each content item of the plurality of content items, a path in the content item-folder hierarchy to the content item.

5. The computer-implemented method of claim 1, wherein each actionable graphical user interface icon is configured, when displayed, to indicate that the corresponding content item is accessible by only a plurality of user accounts associated with the shared workspace.

6. One or more non-transitory computer-readable media storing one or more programs for execution by a personal computing device comprising one or more processors, the one or more programs comprising instructions configured for:

receiving content item metadata indicating a content item-folder hierarchy for a plurality of content items from a server of a cloud-based content management system;

wherein the plurality of content items is hosted with the cloud-based content management system;

wherein the plurality of content items is associated with a shared workspace to which the personal computing device is joined;

after the receiving the content item metadata, using the content item metadata to display actionable graphical user interface icons for the plurality of content items according to the content item-folder hierarchy;

wherein each actionable graphical user interface icon displayed corresponds to one of the plurality of content items and is configured to indicate at most one of the following content item states for the corresponding content item when displayed: that the corresponding content item is currently configured for offline access at the personal computing device, or that the corresponding content item is currently configured for cloud access from the personal computing device;

wherein the actionable graphical user interface icon displayed corresponding to a particular content item of the plurality of content items is configured to indicate that the particular content item is currently configured for cloud access from the personal computing device; and while maintaining the configuration of the actionable graphic user interface icon to indicate that the particular content item is currently configured for cloud access from the personal computing device, and in response to a first request to open the particular content item configured for cloud access, downloading the particular content item to a content item cache at the personal computing device from one or more servers of the cloud-based content management system;

responsive to receiving an action to open and view without editing the particular content item downloaded in response to the first request to open, updating display of the actionable graphical user interface icon corresponding to the particular content item to indicate that the particular content item is currently configured for offline access, wherein the action to open and view without editing is received within a threshold period of time of the first request to open.

7. The one or more non-transitory computer-readable media of claim 6, the instructions further configured for:

in response to the personal computing device being joined to the shared workspace, downloading some but not all of the plurality of content items from one or more servers of the cloud-based content management system.

8. The one or more non-transitory computer-readable media of claim 6, wherein the personal computing device is a first personal computing device, the instructions further configured for:

based on a modification to a second particular content item of the plurality of content items at a second personal computing device that is not the first personal computing device, receiving a notification from a server of the cloud-based content management system; and while maintaining the configuration of the actionable graphic user interface icon to indicate that the second particular content item is currently configured for cloud access from the first personal computing device, and automatically based on the receiving the notification, downloading the second particular content item to the content item cache at the first personal computing device from one or more servers of the cloud-based content management system.

9. The one or more non-transitory computer-readable media of claim 6, wherein each actionable graphical user interface icon is configured, when displayed, to indicate that the corresponding content item is accessible by at least one user account held with the cloud-based content management system that is not included in a plurality of user accounts associated with the shared workspace.

10. A personal computing device comprising:
one or more processors;
storage media;

one or more programs stored in the storage media and having instructions configured for:

receiving content item metadata indicating a content item-folder hierarchy for a plurality of content items from a server of a cloud-based content management system;

wherein the plurality of content items is hosted with the cloud-based content management system;

wherein the plurality of content items is associated with a shared workspace to which the personal computing device is joined;

after the receiving the content item metadata, using the content item metadata to display actionable graphical user interface icons for the plurality of content items according to the content item-folder hierarchy;

wherein each actionable graphical user interface icon displayed corresponds to one of the plurality of content items and is configured to indicate at most one of the following content item states for the corresponding content item when displayed: that the corresponding content item is currently configured for offline access at the personal computing device, or that the corresponding content item is currently configured for cloud access from the personal computing device;

wherein the actionable graphical user interface icon displayed corresponding to a particular content item of the plurality of content items is configured to indicate that the particular content item is currently configured for cloud access from the personal computing device;

while maintaining the configuration of the actionable graphic user interface icon to indicate that the particular content item is currently configured for cloud access from the personal computing device, and in response to a first request to open the particular content item configured for cloud access, downloading the particular content item to a content item cache at the personal computing device from one or more servers of the cloud-based content management system;

responsive to receiving an action to open and view without editing the particular content item downloaded in response to the first request to open, updating display of the actionable graphical user interface icon corresponding to the particular content item to indicate that the particular content item is currently configured for offline access, wherein the action to open and view without editing is received within a threshold period of time of the first request to open.

11. The personal computing device of claim 10, the instructions further configured for:

based on a modification to a second particular content item of the plurality of content items at a second personal computing device that is not the first-referenced personal computing device, receiving a notification from a server of the cloud-based content management system; and while maintaining the configuration of the actionable graphic user interface icon to indicate that the second particular content item is currently configured for cloud access from the first-referenced personal computing device, and automatically based on the receiving the notification, downloading the second particular content item to the content item cache at the first-referenced personal computing device from one or more servers of the cloud-based content management system.

* * * * *